US009454996B2

(12) United States Patent
Kato

(10) Patent No.: US 9,454,996 B2
(45) Date of Patent: Sep. 27, 2016

(54) INFORMATION PROCESSING APPARATUS, INFORMATION PROCESSING METHOD, PLAYBACK APPARATUS, PLAYBACK METHOD, AND PROGRAM

(75) Inventor: Motoki Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 601 days.

(21) Appl. No.: 13/059,194

(22) PCT Filed: Jun. 14, 2010

(86) PCT No.: PCT/JP2010/060014
§ 371 (c)(1),
(2), (4) Date: Feb. 15, 2011

(87) PCT Pub. No.: WO2010/150674
PCT Pub. Date: Dec. 29, 2010

(65) Prior Publication Data
US 2011/0145432 A1 Jun. 16, 2011

(30) Foreign Application Priority Data

Jun. 22, 2009 (JP) ................................ 2009-147768
Feb. 24, 2010 (JP) ................................ 2010-039040

(51) Int. Cl.
*G06F 15/16* (2006.01)
*G11B 27/32* (2006.01)
(Continued)

(52) U.S. Cl.
CPC ............ *G11B 27/329* (2013.01); *G11B 27/10* (2013.01); *G11B 27/105* (2013.01); *G11B 27/3027* (2013.01); *H04N 5/77* (2013.01);
(Continued)

(58) Field of Classification Search
None
See application file for complete search history.

(56) References Cited

U.S. PATENT DOCUMENTS 6,925,250 B1 8/2005 Oshima et al.
2006/0127051 A1* 6/2006 Tsumagari et al. ............ 386/95
(Continued)

FOREIGN PATENT DOCUMENTS

CN 1954606 A 4/2007
CN 101315804 A 12/2008
(Continued)

OTHER PUBLICATIONS

Japanese Office Action issued Dec. 27, 2011 in patent application No. 2010-039040 with English translation.
(Continued)

*Primary Examiner* — Karen Tang
(74) *Attorney, Agent, or Firm* — Oblon, McClelland, Maier & Neustadt, L.L.P.

(57) ABSTRACT

The present invention relates to an information processing apparatus, an information processing method, a playback apparatus, a playback method, and a program that are capable of appropriately playing back content of 3D images. A Base view video stream (L image) and a Dependent view video stream (R image), which are generated using H.264 AVC/MVC encoding method, and a PlayList, which is information for controlling playback, are recorded on an optical disc 2. If the value of MVC_flag that is set in the PlayList represents that information regarding 3D playback is included, 3D playback is performed while also referring to the description of ExtensionData( ) in the PlayList. Information regarding playback of the Dependent view video stream is described in the field for ExtensionData( ). The present invention is applicable to a Blu-Ray (registered trademark) Disc player.

6 Claims, 38 Drawing Sheets

(51) Int. Cl.
| | |
|---|---|
| G11B 27/10 | (2006.01) |
| G11B 27/30 | (2006.01) |
| H04N 5/77 | (2006.01) |
| H04N 5/85 | (2006.01) |
| H04N 9/82 | (2006.01) |
| H04N 13/00 | (2006.01) |
| H04N 9/804 | (2006.01) |

(52) U.S. Cl.
CPC ............ H04N 5/85 (2013.01); H04N 9/8211 (2013.01); H04N 9/8233 (2013.01); H04N 13/0055 (2013.01); G11B 2220/2541 (2013.01); H04N 9/8042 (2013.01)

(56) References Cited

U.S. PATENT DOCUMENTS

| | | |
|---|---|---|
| 2007/0047912 A1* | 3/2007 | Hattori et al. ................... 386/95 |
| 2007/0086727 A1 | 4/2007 | Tanaka et al. |
| 2007/0274676 A1 | 11/2007 | Diomelli et al. |
| 2008/0031599 A1 | 2/2008 | Ikeda et al. |
| 2008/0304814 A1* | 12/2008 | Fujii et al. .................... 386/126 |
| 2010/0046912 A1 | 2/2010 | Ikeda et al. |
| 2010/0150529 A1* | 6/2010 | Leichsenring et al. ......... 386/95 |
| 2011/0064374 A1 | 3/2011 | Ikeda et al. |
| 2011/0064382 A1 | 3/2011 | Ikeda et al. |

FOREIGN PATENT DOCUMENTS

| | | |
|---|---|---|
| EP | 1 011 268 A1 | 6/2000 |
| EP | 1 715 686 A1 | 10/2006 |
| JP | 11 191895 | 7/1999 |
| JP | 4642939 B2 | 3/2011 |
| WO | WO 2004/023484 A1 | 3/2004 |
| WO | 2006 009305 | 1/2006 |
| WO | WO 2006/019259 A1 | 2/2006 |
| WO | 2009 133714 | 11/2009 |

OTHER PUBLICATIONS

International Search Report Issued Sep. 14, 2010 in PCT/JP10/060014 filed Jun. 14, 2010.
Extended Search Report issued Feb. 11, 2013 in European Application No. 10791992.0.
Office Action issued Dec. 10, 2014 in Chinese Patent Application No. 201210506272.X (with English translation).
Examination Report issued Dec. 18, 2014 in Singaporean Patent Application No. 201209029-6.

* cited by examiner

FIG. 11

```
1:  yyyyy.mpls {
2:     AppInfoPlayList();
3:     PlayList();
4:     PlayListMark();
5:     ExtensionData();
6:  }

7:  AppInfoPlayList() {
8:     ...
9:     MVC_flag;
10:    ...
11: }

12: PlayList() {
13:    number_of_PlayItems;
14:    number_of_SubPaths;
15:    for (PlayItem_id=0;
16:         PlayItem_id<number_of_PlayItems;
17:         PlayItem_id++) {
18:       PlayItem();
19:    }
20:    for (SubPath_id=0;
21:         SubPath_id<number_of_SubPaths;
22:         SubPath_id++) {
23:       SubPath();
24:    }
25: }

26: PlayItem() {
27:    Clip_Information_file_name;
28:    MVC_file_type;
29:    reserved;
30:    IN_time;
31:    OUT_time;
32:    STN_table() {ref_to_L_video_PID;}
33: }

34: SubPath() {
35:    SubPath_type;
36:    number_of_SubPlayItems;
37:    for (i=0; i<number_of_SubPlayItems; i++) {
38:       SubPlayItem();
39:    }
40: }

41: SubPlayItem() {
42:    Clip_Information_file_name;
43:    SubPlayItem_IN_time;
44:    SubPlayItem_OUT_time;
45: }

46: ExtensionData() {
47:    SubPath_entries_extension();
48:    STN_table_extension();
49: }
```

FIG. 12

| MVC_flag | Meaning |
|---|---|
| 0 | THIS PlayList DOES NOT INCLUDE INFORMATION REGARDING MVC PLAYBACK. |
| 1 | THIS PlayList INCLUDES INFORMATION REGARDING MVC PLAYBACK. |

FIG. 13

| MVC_file_type | Meaning |
|---|---|
| 0 | BOTH OF L video and R video ARE SUPPLIED FROM ONE TS REPRESENTED BY Clip_Information_file_name. |
| 1 | FIRST TS file INCLUDING L VIDEO REPRESENTED BY Clip_Inforamtion_file_name AND SECOND TS file INCLUDING R video ARE INTERLEAVED ON BD-ROM disc. |
| 2 | BOTH OR ONE OF FIRST TS file INCLUDING L VIDEO REPRESENTED BY Clip_Inforamtion_file_name AND SECOND TS file INCLUDING R video ARE SUPPLIED FROM LOCAL STORAGE. |
| 3 | Reserved |

FIG. 14

| SubPath_type | Meaning |
|---|---|
| 0 | reserved |
| 1 | reserved |
| 2 | Out-of-mux and primary audio presentation path of the Browsable slideshow<br>(The audio presentation path using the SubPath is not synchronized with the main path using PlayItems in the PlayList.) |
| 3 | Out-of-mux and interactive graphics menu<br>(The interactive graphics menu using the SubPath is not synchronized with the main path using PlayItems in the PlayList.) |
| 4 | Out-of-mux and text subtitle presentation path<br>(The text subtitle presentation path using the SubPath is synchronized with the main path using PlayItems in the PlayList.) |
| 5 | Out-of-mux and AV synchronized type of one or more elementary streams path<br>(Primary audio/PG/IG/Secondary audio path.)<br><br>Out-of-mux and AV synchronized type of Picture-in-Picture presentation path which contains one or more elementary stream paths.<br><br>(The elementary streams used by the path are multiplexed in a separate Clip from other Clip used by PlayItem. The path using the SubPath is synchronized with the main path using PlayItems in the PlayList.) |
| 6 | Out-of-mux and AV non-synchronized type of Picture-in-Picture presentation path which contains one or more elementary stream paths.<br><br>(The elementary streams used by the path are multiplexed in a separate Clip from other Clip used by PlayItem. The path using the SubPath is not synchronized with the main path using PlayItems in the PlayList.) |
| 7 | In-mux type and AV synchronized type of Picture-in-Picture presentation path which contains one or more elementary stream paths.<br><br>(The elementary streams used by the path is multiplexed in the same Clip used by PlayItem. The path using the SubPath is synchronized with the main path using PlayItems in the PlayList.) |
| 8-255 | reserved |

FIG. 15

SubPath_entries_extension()

| Syntax | No. of bits | Mnemonic |
|---|---|---|
| SubPath_entries_extension() { | | |
|   length | 32 | uimsbf |
|   number_of_SubPath_extensions | 16 | uimsbf |
|   for (SubPath_id=number_of_SubPaths;<br>    SubPath_id<number_of_SubPaths<br>    +number_of_SubPath_extensions;<br>    SubPath_id++) { | | |
|     SubPath_extension() | | |
|   } | | |
| } | | |

FIG. 16

SubPath_extension()

| Syntax | No. of bits | Mnemonic |
|---|---|---|
| SubPath_extension() { | | |
|   length | 32 | uimsbf |
|   reserved_for_future_use | 8 | bslbf |
|   SubPath_type_extension | 8 | bslbf |
|   reserved_for_future_use | 24 | bslbf |
|   number_of_SubPlayItems | 8 | uimsbf |
|   for (i=0;i<number_of_SubPlayItems;i++) { | | |
|     SubPlayItem(i) | | |
|   } | | |
| } | | |

FIG. 17

| SubPath_type_extension | Meaning |
|---|---|
| 0-7 | N/A |
| 8 | OUT-of-mux and R (dependent) video path<br><br>SUB PLAYBACK PATH OF TS INCLUDING MVC R (dependent) video, THE TS BEING A FILE DIFFERENT FROM TS FOR MAIN PLAYBACK PATH OF PlayItem. |
| others | reserved |

FIG. 18

STN_table_extension

| Syntax | No. of bits | Mnemonic |
|---|---|---|
| STN_table_extension() { | | |
|   for(PlayItem_id=0;PlayItem_id<number_of_PlayItems; PlayItem_id++) { | | uimsbf |
|     length | 16 | uimsbf |
|     ref_to_R_video_info() { | | |
|       stream_entry() | | |
|       stream_attributes() | | |
|     } | | |
|   } | | |
| } | | |

FIG. 19 stream_entry()

| Syntax | No. of bits | Mnemonic |
|---|---|---|
| stream_entry() { | | |
|   length | 8 | uimsbf |
|   type | 8 | bslbf |
|   if(type==1) { | | |
|     ref_to_stream_PID_of_mainClip | 16 | uimsbf |
|     reserved_for_future_use | 48 | bslbf |
|   } else if(type==2) { | | |
|     ref_to_SubPath_id | 8 | uimsbf |
|     ref_to_subClip_entry_id | 8 | uimsbf |
|     ref_to_stream_PID_of_subClip | 16 | uimsbf |
|     reserved_for_future_use | 32 | bslbf |
|   } | | |
| } | | |

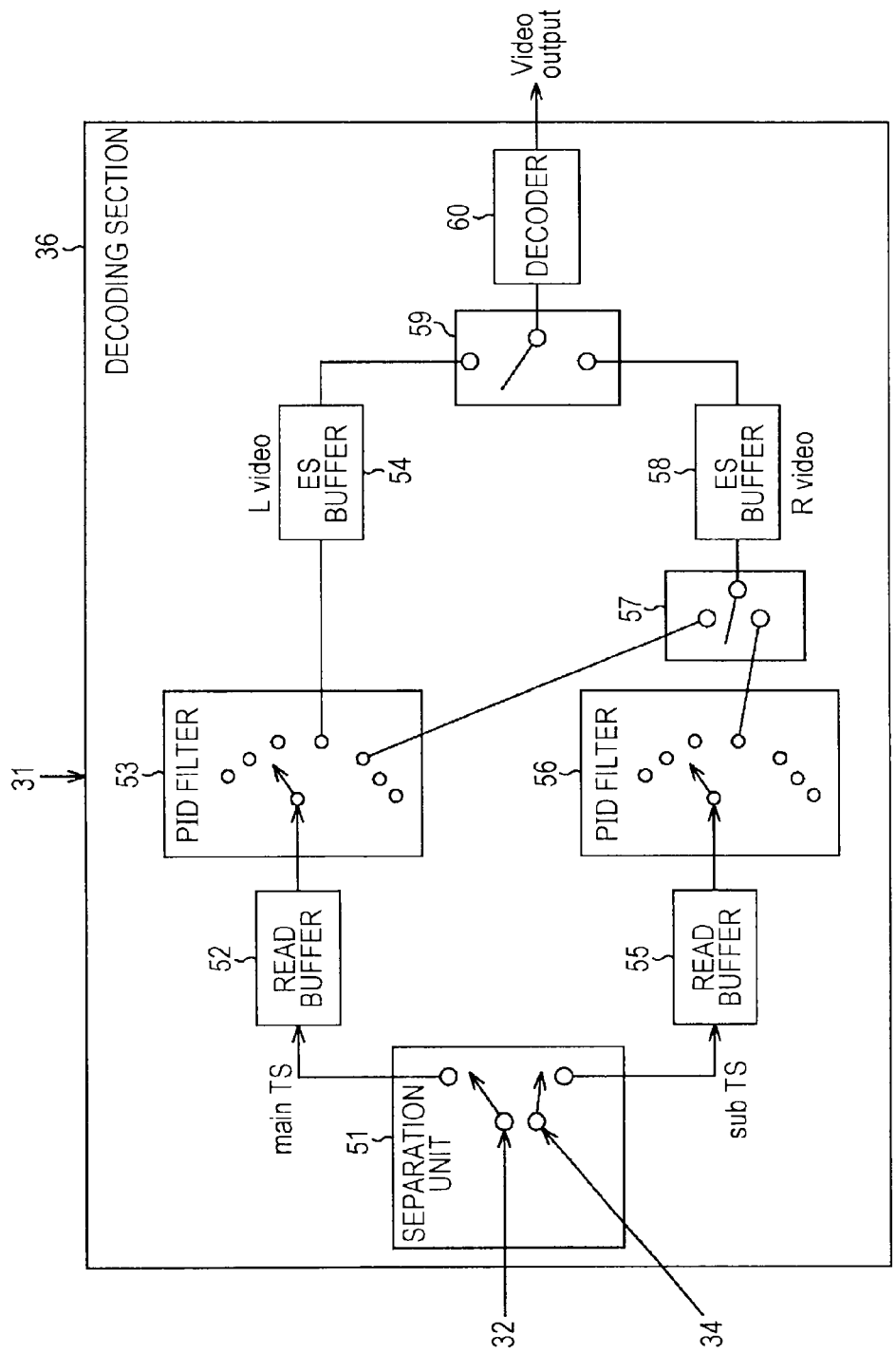

FIG. 23

```
00000.mpls{
  AppInfoPlayList() {MVC_flag=1}
  PlayList() {
    PlayItem() {
      "00001" ; // ref to 00001.clpi
      MVC_file_type=1;
      IN_time; OUT_time;
      STN_table() {ref_to_L_video_PID;}
    }
  }
  ExtensionData() {
    SubPath_entries_extension() {
      SubPath_extension() {//SubPath_id=0 IS ASSIGNED TO THIS SubPath
        SubPath_type_extension=8;
        SubPlayItem() {
          "00002" ; // ref to 00002.clpi
          SubPlayItem_IN_time; SubPlayItem_OUT_time;
        }
      }
    }
    STN_table_extension() {type=2; ref_to_SubPath_id=0
    ref_to_R_video_PID;}
  }
}
```

FIG. 24

A
```
00001.clpi {
  number_of_source_packets1
  EP_map
  chunk_map ()
}
```

B
```
00002.clpi {
  number_of_source_packets2
  EP_map
  chunk_map ()
}
```

FIG. 27

```
chunk_map() {
    number_of_chunks
    for (i=0; i<number_of_chunks; i++) {
        SPN_chunk_start[i]
    }
}
```

FIG. 28

A
```
00001.clpi {
    number_of_source_packets1
    EP_map
    chunk_map() {
        n+1,
        0, a1, a2, ···, an
    }
}
```

B
```
00002.clpi {
    number_of_source_packets2
    EP_map
    chunk_map() {
        n+1,
        0, b1, b2, ···, bn
    }
}
```

FIG. 30

```
EP_map() {
    number_of_EP_entries
    for (i=0; i< number_of_EP_entries; i++) {
        PTS_EP_start[i]
        SPN_EP_start[i]
    }
}
```

FIG. 31

A
```
00000.mpls {
  AppInfoPlayList() {MVC_flag=1}
  PlayList() {
    PlayItem() {
      "00001" ; // ref to 00001.clpi
      MVC_file_type=0;
      IN_time; OUT_time;
      STN_table() {ref_to_L_video_PID;}
    }
  }
  ExtensionData() {
    STN_table_extension() {type=1; ref_to_R_video_PID;}
  }
}
```

B
```
00001.clpi {
  EP_map
}
```

FIG. 34

```
00000.mpls {
 AppInfoPlayList() {MVC_flag=1}
 PlayList() {
   PlayItem() {
     "00001" : // ref to 00001.clpi
     MVC_file_type=2;
     IN_time; OUT_time;
         STN_table() {ref_to_L_video_PID;}
   }
 }
 ExtensionData() {
   SubPath_entries_extension() {
     SubPath_extension() {//SubPath_id=0  IS ASSIGNED TO THIS SubPath
       SubPath_type_extension=8;
       SubPlayItem() {
         "00003" : // ref to 00003.clpi
         SubPlayItem IN_time; SubPlayItem OUT_time;
       }
     }
   }
   STN_table_extension() {type=2; ref_to_SubPath_id=0
   ref_to_R_video_PID;}
 }
}
```

FIG. 38

```
00000.mpls{
 AppInfoPlayList() {MVC_flag=1}
 PlayList() {
    PlayItem() {
       "00001" ; // ref to 00001.clpi
       MVC_file_type=1;
       IN_time; OUT_time;
       STN_table() [ref_to_L_video_PID;]
    }
 }
 ExtensionData() {
    SubPath_entries_extension() {
       SubPath() {
          SubPath_type=8;
          SubPlayItem() {
             "00002" ; // ref to 00002.clpi
             IN_time; OUT_time;
          }
       }
    }
    STN_table_extension() {type=2; ref_to_SubPath_id;
    ref_to_R_video_PID;}
 }
}
```

FIG. 39

A
```
00001.clpi {
    number_of_source_packets1
    EP_map
    chunk_map()
}
```

B
```
00002.clpi {
    number_of_source_packets2
    EP_map
    chunk_map()
}
```

# INFORMATION PROCESSING APPARATUS, INFORMATION PROCESSING METHOD, PLAYBACK APPARATUS, PLAYBACK METHOD, AND PROGRAM

TECHNICAL FIELD

The present invention relates to an information processing apparatus, an information processing method, a playback apparatus, a playback method, and a program, and in particular, to an information processing apparatus, an information processing method, a playback apparatus, a playback method, and a program that are capable of appropriately playing back 3D image content.

BACKGROUND ART

In recent years, three-dimensional (3D) image content that enables stereoscopic vision has been receiving attention. Examples of methods for displaying a 3D image include various methods such as a method of alternately displaying an image for the left eye and an image for the right eye. Whichever method is used, the data size of a 3D image is larger than that of a 2D image.

A large-capacity recording medium is necessary to record high-resolution content, such as a movie, as a 3D image having a large data size.

Examples of such a large-capacity recording medium include a Blu-Ray (registered trademark) Disc (hereinafter called a BD, as appropriate) such as a BD-ROM.

CITATION LIST

Patent Literature

PTL 1: Japanese Unexamined Patent Application Publication No. 11-195287

SUMMARY OF INVENTION

Technical Problem

Meanwhile, how to record 3D image content on a BD and play back the content is not specified by the current BD standard.

If the method of recording and playing back 3D image content is left to an author (author) who performs authoring of the 3D image content, it may happen that the 3D image content cannot be appropriately played back.

Therefore, it is necessary to specify how to record and play back 3D image content. Moreover, it is necessary to specify how to record and play back 3D content so that compatibility is maintained and at least 2D images can be played back by existing players for 2D playback.

The present invention, which has been achieved with consideration of such a situation, enables 3D image content to be appropriately played back from a recording medium such as a BD or the like.

Solution to Problem

An information processing apparatus according to an aspect of the present invention includes setting means that sets information for specifying a sub playback path that refers to an extended stream and information for specifying a PID of a transport packet of the extended stream by using a first field and a second field, the extended stream and a basic stream being generated by encoding a video stream using a predetermined encoding method, the first and second fields being defined in an extended field of a PlayList that is information for controlling playback of content, the first field being a field in which information regarding a sub playback path is described, the second field being a field in which information regarding a stream number is described.

The basic stream and the extended stream are respectively a Base view video stream and a Dependent view video stream that are generated by encoding a video stream using H.264 AVC/MVC encoding method, and the setting means may set in the first field, as information for specifying the sub playback path, information representing that a type of the sub playback path is a path that refers to the Dependent view video stream and a filename of a file for clip information that is attribute information regarding the Dependent view video stream.

The basic stream and the extended stream are respectively a Base view video stream and a Dependent view video stream that are generated by encoding a video stream using H.264 AVC/MVC encoding method, and the setting means may set in the second field an ID of the sub playback path as information for specifying the sub playback path and a PID of a transport packet of the Dependent view video stream.

An information processing method according to an aspect of the present invention includes the step of setting information for specifying a sub playback path that refers to an extended stream and information for specifying a PID of a transport packet of the extended stream by using a first field and a second field, the extended stream and a basic stream being generated by encoding a video stream using a predetermined encoding method, the first and second fields being defined in an extended field of a PlayList that is information for controlling playback of content, the first field being a field in which information regarding a sub playback path is described, the second field being a field in which information regarding a stream number is described.

A program according to an aspect of the present invention causes a computer to execute the processing including the step of setting information for specifying a sub playback path that refers to an extended stream and information for specifying a PID of a transport packet of the extended stream by using a first field and a second field, the extended stream and a basic stream being generated by encoding a video stream using a predetermined encoding method, the first and second fields being defined in an extended field of a PlayList that is information for controlling playback of content, the first field being a field in which information regarding a sub playback path is described, the second field being a field in which information regarding a stream number is described.

A playback apparatus according to another aspect of the present invention includes control means that controls playback of an extended stream on the basis of information for specifying a sub playback path that refers to the extended stream and information for specifying a PID of a transport packet of the extended stream, the extended stream and a basic stream being generated by encoding a video stream using a predetermined encoding method, the information for specifying the sub playback path and the information for specifying the PID being set in a first field and a second field, the first and second fields being defined in an extended field of a PlayList that is information for controlling playback of content, the first field being a field in which information regarding a sub playback path is described, the second field being a field in which information regarding a stream number is described.

The basic stream and the extended stream are respectively a Base view video stream and a Dependent view video stream that are generated by encoding a video stream using H.264 AVC/MVC encoding method, and the control means may control playback of the Dependent view video while controlling playback of the Base view video stream on the basis of information that specifies a main playback path that refers to the Base view video stream and the PID of a transport packet of the Base view video stream, the information being set in a field in the PlayList, the field being a field in which information regarding the main playback path is described.

A playback method according to another aspect of the present invention includes the step of controlling playback of an extended stream on the basis of information for specifying a sub playback path that refers to the extended stream and information for specifying a PID of a transport packet of the extended stream, the extended stream and a basic stream being generated by encoding a video stream using a predetermined encoding method, the information for specifying a sub playback path and the information for specifying the PID being set in a first field and a second field, the first and second fields being defined in an extended field of a PlayList that is information for controlling playback of content, the first field being a field in which information regarding a sub playback path is described, the second field being a field in which information regarding a stream number is described.

A program according to another aspect of the present invention causes a computer to perform processing including the step of controlling playback of an extended stream on the basis of information for specifying a sub playback path that refers to the extended stream and information for specifying a PID of a transport packet of the extended stream, the extended stream and a basic stream being generated by encoding a video stream using a predetermined encoding method, the information for specifying the sub playback path and the information for specifying the PID being set in a first field and a second field, the first and second fields being defined in an extended field of a PlayList that is information for controlling playback of content, the first field being a field in which information regarding the sub playback path is described, the second field being a field in which information regarding a stream number is described.

According to an aspect of the present invention, information for specifying a sub playback path that refers to an extended stream and information for specifying a PID of a transport packet of the extended stream are set by using a first field and a second field, the extended stream and a basic stream being generated by encoding a video stream using a predetermined encoding method, the first and second fields being defined in an extended field of a PlayList that is information for controlling playback of content, the first field being a field in which information regarding a sub playback path is described, the second field being a field in which information regarding a stream number is described.

According to another aspect of the present invention, playback of an extended stream is controlled on the basis of information for specifying a sub playback path that refers to the extended stream and information for specifying a PID of a transport packet of the extended stream, the extended stream and a basic stream being generated by encoding a video stream using a predetermined encoding method, the information for specifying the sub playback path and the information for specifying the PID being set in a first field and a second field, the first and second fields being defined in an extended field of a PlayList that is information for controlling playback of content, the first field being a field in which information regarding a sub playback path is described, the second field being a field in which information regarding a stream number is described.

Advantageous Effects of Invention

With the present invention, 3D image content can be appropriately played back.

BRIEF DESCRIPTION OF DRAWINGS

FIG. 11 is a diagram illustrating the syntax of a PlayList file.

FIG. 12 is a diagram illustrating the meaning of MVC_flag.

FIG. 13 is a diagram illustrating the meaning of MVC_file_type.

FIG. 14 is a diagram illustrating the meaning of SubPath_type.

FIG. 15 is a diagram illustrating the syntax of SubPath_entries_extention( ).

FIG. 16 is a diagram illustrating the syntax of SubPath_extention( ).

FIG. 17 is a diagram illustrating the meaning of SubPath_type_extention.

FIG. 18 is a diagram illustrating the syntax of STN_table_extention( ).

FIG. 19 is a diagram illustrating the syntax of stream_entry( ).

FIG. 22 is a block diagram illustrating an example configuration of a decoding section.

FIG. 23 is a diagram illustrating a specific example of a PlayList file.

FIG. 24 is a diagram illustrating the syntax of a clpi file.

FIG. 27 is a diagram illustrating the syntax of chunk_map( ).

FIG. 28 is a diagram illustrating a specific example of chunk_map( ).

FIG. 30 is diagram illustrating the syntax of EP_map( ).

FIG. 31 is a diagram illustrating another example of a PlayList file.

FIG. 34 is a diagram illustrating still another example of a PlayList file.

FIG. 38 is a diagram illustrating an example of a PlayList file.

FIG. 39 is a diagram illustrating the syntax of a clpi file.

DESCRIPTION OF EMBODIMENTS

Example Configuration of Playback System

Figure 1:
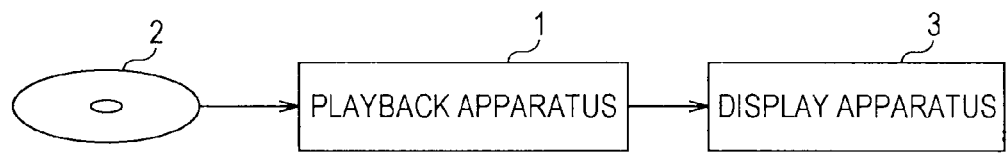
FIG. 1 is a diagram illustrating an example configuration of a playback system including a playback apparatus to which the present invention is applied.

FIG. 1 is a diagram illustrating an example configuration of a playback system including a playback apparatus 1 to which the present invention is applied.

This playback system includes the playback apparatus 1 and a display apparatus 3 that are connected by an HDMI (High Definition Multimedia Interface) cable or the like. An optical disc 2, which is a BD format optical disc such as a BD-ROM, is loaded in the playback apparatus 1.

A stream that is necessary for displaying a 3D image having two viewpoints is recorded on the optical disc 2. As an encoding method for recording the stream on the optical disc 2, H.264 AVC (Advanced Video Coding)/MVC (Multi-view Video coding), for example, is used.

The playback apparatus 1 is a player that is capable of performing 3D playback of a stream that is recorded on the optical disc 2. The playback apparatus 1 plays back a stream that is recorded on the optical disc 2, and causes the display apparatus 3, which is a television set or the like, to display a 3D image obtained by the playback. Likewise, audio is played back by the playback apparatus 1 and output to a speaker or the like that is disposed in the display apparatus 3. Note that the playback apparatus 1 is capable of performing 2D playback as with existing BD players.

[H.264 AVC/MVC Profile]

In H.264 AVC/MVC, an image stream called Base view video and an image stream called Dependent view video are defined. Hereinafter, H.264 AVC/MVC will be simply called MVC, as appropriate.

Figure 2:
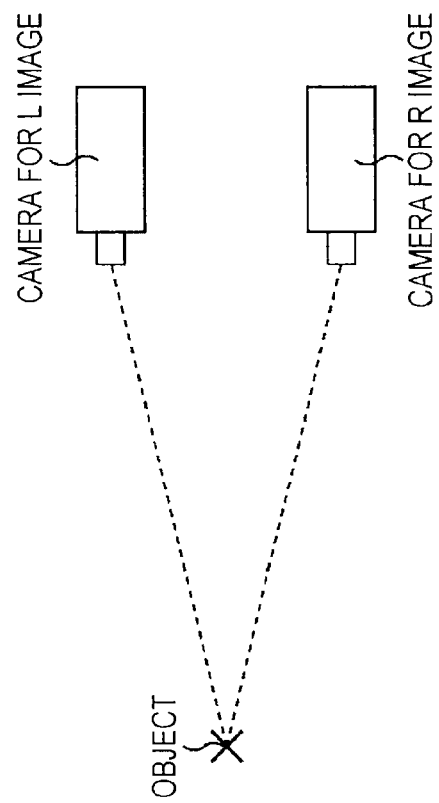
FIG. 2 is a diagram illustrating an example of image capturing.

FIG. 2 is a diagram illustrating an example of image capturing.

As illustrated in FIG. 2, images of the same object are captured by using a camera for an L image (left viewpoint) and a camera for an R (right viewpoint) image. Elementary streams of the images captured by the L image camera and the R image camera are input to an MVC encoder.

Figure 3:
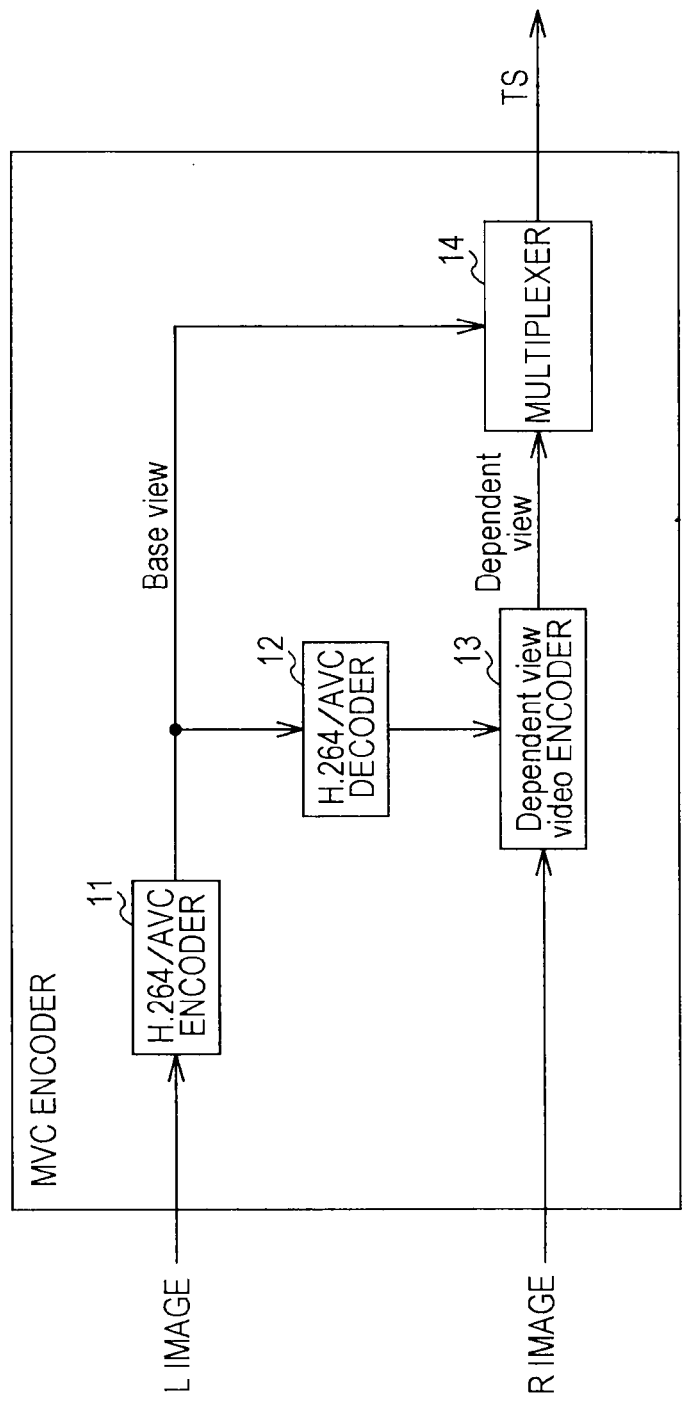
FIG. 3 is a block diagram illustrating an example configuration of an MVC encoder.

FIG. 3 is a block diagram illustrating an example configuration of the MVC encoder.

As illustrated in FIG. 3, the MVC encoder includes an H.264/AVC encoder 11, an H.264/AVC decoder 12, a Dependent view video encoder 13, and a multiplexer 14.

An L image stream captured by the L image camera is input to the H.264/AVC encoder 11. Moreover, an R image stream captured by the R image camera is input to the Dependent view video encoder 13.

The H.264/AVC encoder 11 encodes the L image stream into, for example, an H.264 AVC/High Profile video stream. The H.264/AVC encoder 11 outputs the encoded AVC video stream to the H.264/AVC decoder 12 and to the multiplexer 14 as a Base view video stream.

The H.264/AVC decoder 12 decodes the AVC video stream, which is supplied from the H.264/AVC encoder 11, and outputs the decoded L image stream to the Dependent view video encoder 13.

The Dependent view video encoder 13 encodes the L image stream, which is supplied from the H.264/AVC decoder 12, and an R image stream, which is input from the outside, and outputs a Dependent view video stream.

Figure 4:
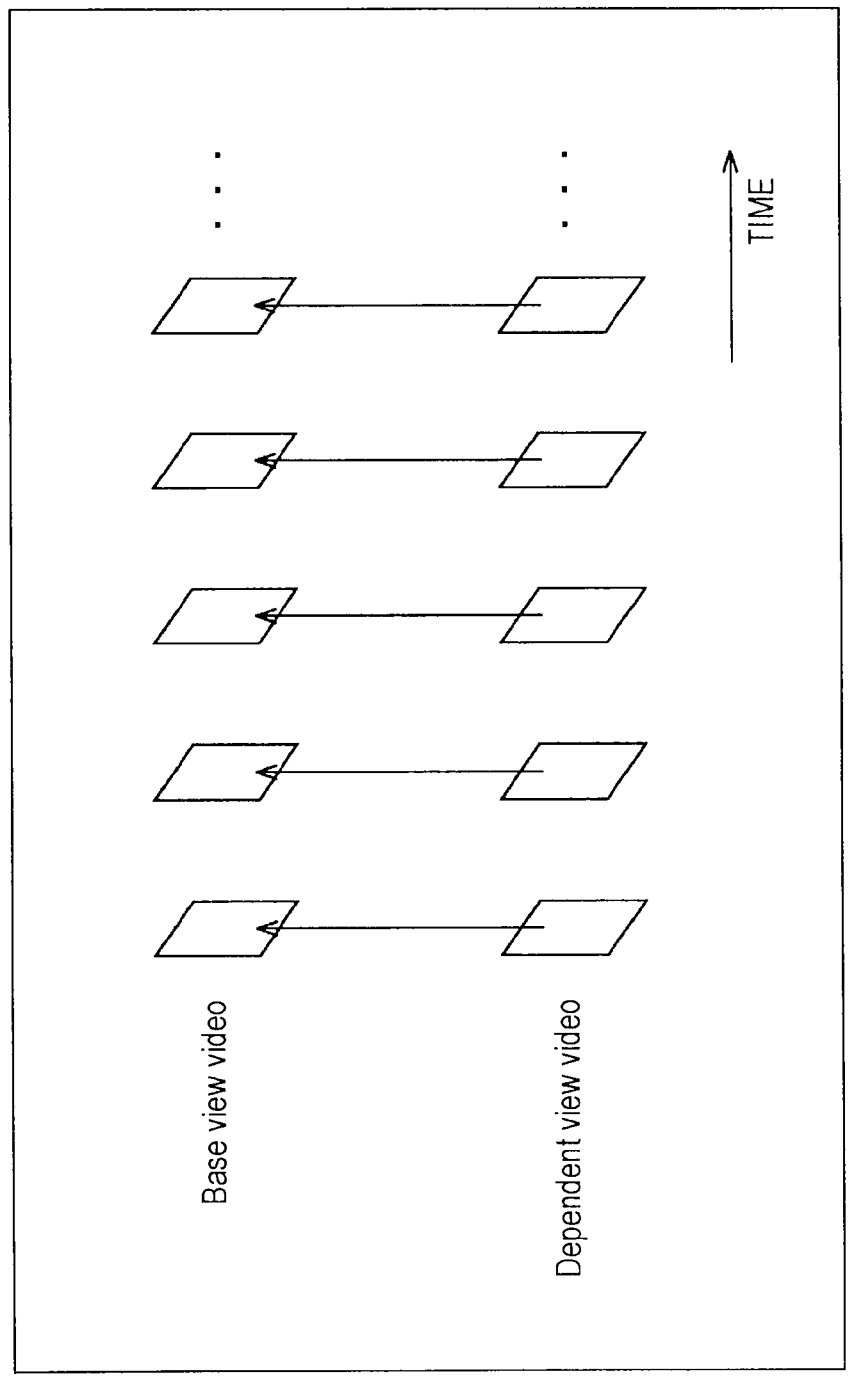
FIG. 4 is a diagram illustrating an example of reference between images.

Predictive encoding of the Base view video using another stream as a reference image is not allowed. However, as illustrated in FIG. 4, predictive encoding of the Dependent view video using the Base view video as a reference image is allowed. For example, when encoding is performed by using an L image as the Base view video and an R image as the Dependent view video, the data size of a resultant Dependent view video stream is smaller than the data size of the Base view video stream.

Note that, since the encoding method is H.264/AVC, prediction in the time domain is performed on the Base view video. Moreover, prediction between views and prediction in the time domain are performed on the Dependent view video. In order to decode the Dependent view video, it is necessary that decoding of the corresponding Base view video, to which reference has been made when encoding, be finished beforehand.

The Dependent view video encoder 13 outputs the Dependent view video stream, which has been encoded by also using such prediction between views, to the multiplexer 14.

The multiplexer 14 multiplexes the Base view video stream, which is supplied from the H.264/AVC encoder 11, and the Dependent view video stream, which is supplied from the Dependent view video encoder 13, into, for example, an MPEG2 TS. The Base view video stream and the Dependent view video stream may be multiplexed into one MPEG2 TS or may be included in separate MPEG2 TSs.

The multiplexer 14 outputs the generated TS (MPEG2 TS). The TS, which is output from the multiplexer 14, is recorded, together with other management data, on the optical disc 2 by a recording apparatus, and is provided to the playback apparatus 1.

In this example, the L image is encoded as a Base view video and the R image is encoded as a Dependent view video by using MVC method. However, on the contrary, the R image may be encoded as a Base view video and the L image may be encoded as a Dependent view video. Hereinafter, a case where the L image is encoded as a Base view video and the R image is encoded as a Dependent view video will be described.

When performing 3D playback in accordance with a command by a user or the like, the playback apparatus 1 reads the Base view video stream and the Dependent view video stream from the optical disc 2 and performs playback.

Moreover, when performing 2D playback, the playback apparatus 1 reads only the Base view video stream from the optical disc 2 and performs playback. Since the Base view video stream is an AVC video stream encoded by H.264/AVC, a player compatible with the BD format can play back the Base view video stream and make a 2D image be displayed.

[Example Configuration of TS]

Figure 5:
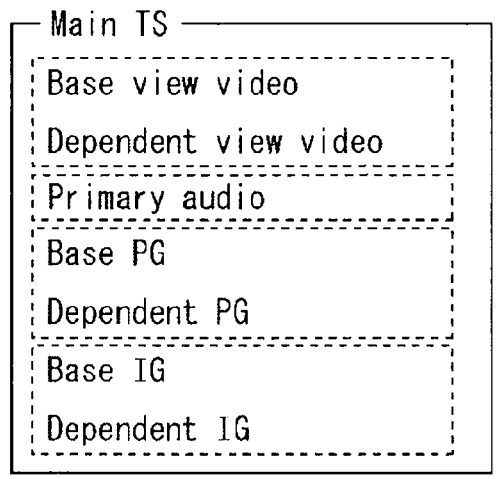
FIG. 5 is a diagram illustrating an example configuration of a TS.

FIG. 5 is a diagram illustrating an example configuration of a TS that is recorded on the optical disc 2.

In the Main TS of FIG. 5, respective streams of Base view video, Dependent view video, Primary audio, Base PG, Dependent PG, Base IG, and Dependent IG are multiplexed. In this way, the Dependent view video stream and the Base view video stream may be included in the Main TS, which is one TS.

The Main TS is a TS that includes at least the Base view video stream. In contrast, a Sub TS is a TS that includes a stream other than the Base view video stream and that is used together with the Main TS during playback. On the optical disc 2, the Sub TS may be recorded in addition to the Main TS, as appropriate.

In order to enable 3D display as with the video, respective streams of the Base view and the Dependent view are prepared for PG (Presentation Graphics), such as subtitles and the like, and for IG (Interactive Graphics), such as a menu screen and the like.

Figure 6:
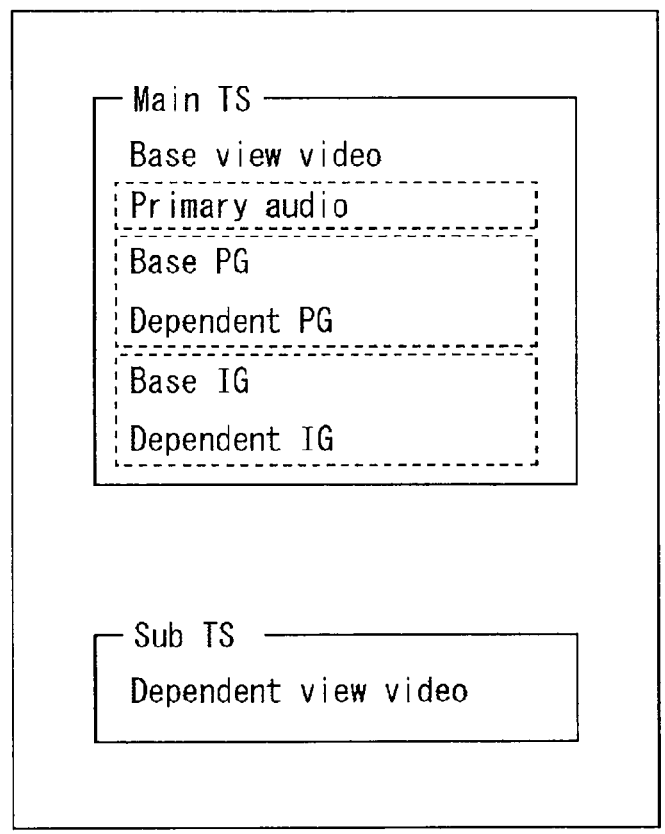
FIG. 6 is a diagram illustrating another example configuration of a TS.

FIG. 6 is a diagram illustrating another example configuration of a TS that is recorded on the optical disc 2.

In the Main TS of FIG. 6, respective streams of Base view video, Primary audio, Base PG, Dependent PG, Base IG, and Dependent IG are multiplexed.

On the other hand, the Sub TS includes a Dependent view video stream. In this way, the Dependent view video stream may be included in a TS that is different from that for the Base view video stream.

When the Base view video stream and the Dependent view video stream are included in different TSs as illustrated in FIG. 6, the TS files are interleaved and recorded on the optical disc 2.

Figure 7:
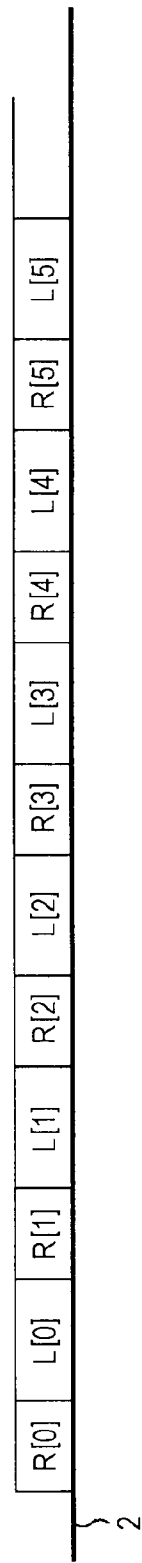
FIG. 7 is a diagram illustrating an example arrangement of data on an optical disc.

FIG. 7 is a diagram illustrating an example of the arrangement of a TS file including the Base view video stream (L video stream) and a TS file including the Dependent view video stream (R video stream) on the optical disc 2.

As illustrated in FIG. 7, the TS file including the L video stream and the TS file including the R video stream are interleaved so that predetermined data units are alternately arranged, and are recorded on the optical disc 2. A collection of source packets that are included in one TS file and that are serially arranged on the optical disc 2 is called a chunk.

In FIG. 7, each block that is denoted by the character "R" and a number represents an R video chunk, and each block that is denoted by the character "L" and a number represents an L video chunk.

During 3D playback, reading from the optical disc 2 is performed, for example, in the order of R[0], L[0], R[1], L[1], R[2], L[2], R[3], L[3], R[4], L[4], R[5], L[5], . . . , and decoding is performed in the order of L[0], R[0], L[1], R[1], L[2], R[2], L[3], R[3], L[4], R[4], L[5], R[5], . . . . As described above, in order to decode the R video, it is necessary that the L video to which reference is made when encoding be decoded beforehand. An R video chunk and an L video chunk denoted by the same number are data items that are necessary for performing playback at the same time, and are used as a set during 3D playback.

That is, for simplicity of description, a case where the entirety of content playback time is divided into three equal parts will be considered. When the entirety of content playback time is divided into three equal parts by the playback start time 0, t1, and t2 in the order of time, L video data that is necessary for performing playback from the playback start time to the time t1 is divided as a chunk L[0].

Moreover, L video data that is necessary for performing playback from the time t1 to the time t2 is divided as a chunk L[1], and L video data that is necessary for performing playback from the time t2 to the playback end time is divided as a chunk L[2].

Also for the R video stream, R video data that is necessary for performing playback from the playback start time to the time t1 is divided as a chunk R[0].

Moreover, R video data that is necessary for performing playback from the time t1 to the time t2 is divided as a chunk R[1], and R video data that is necessary for performing playback from the time t2 to the playback end time is divided as a chunk R[2].

The chunks, which have been obtained by such division, are arranged so that the chunks denoted by the same number are arranged in the order of an R video chunk and an L video chunk, and are recorded on the optical disc 2. Note that, when the L video stream and the R video stream are included in one TS as illustrated in FIG. 5, the TS file is not interleaved and recorded on the optical disc 2.

[Structure for Managing AV Stream]

Figure 8:
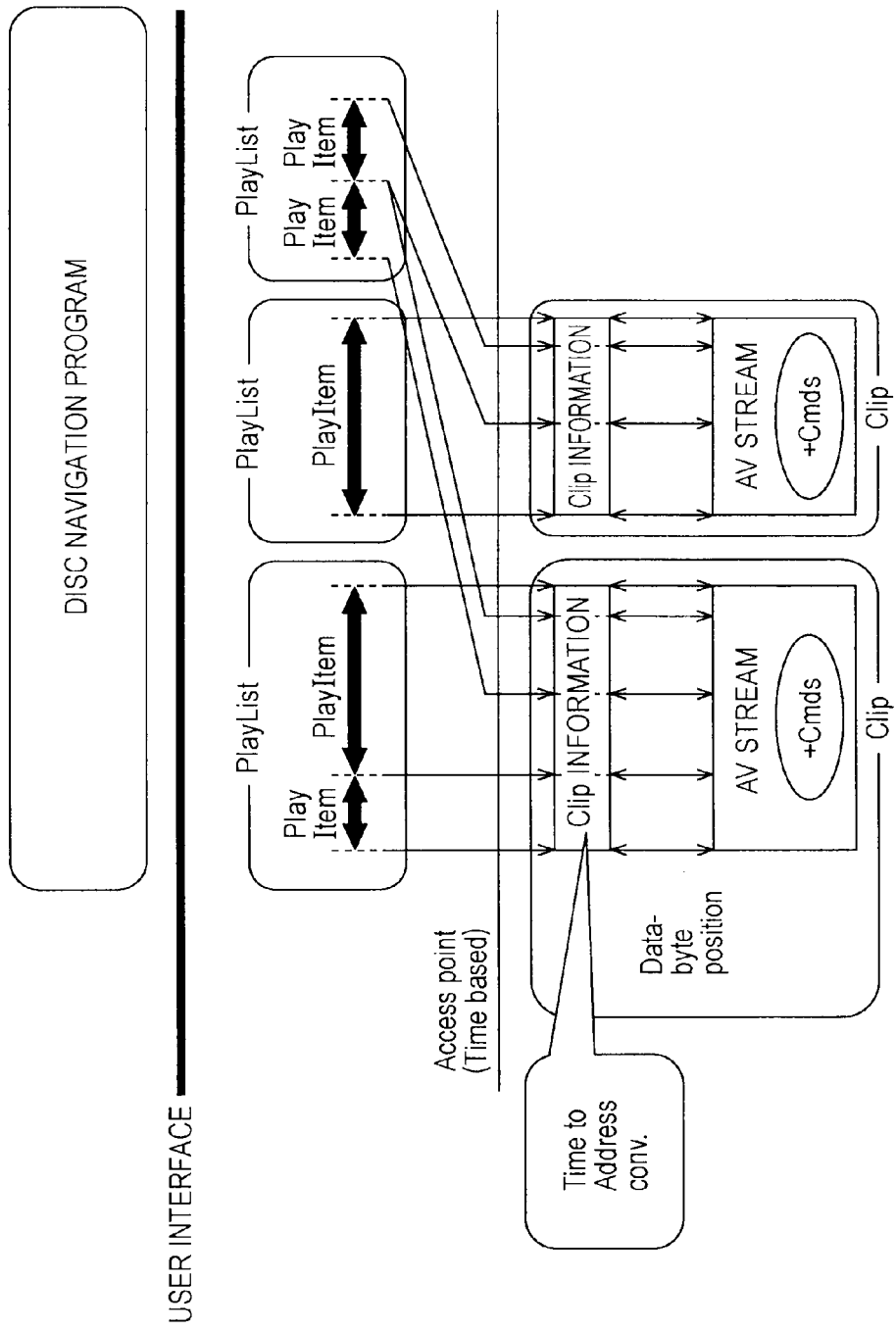
FIG. 8 is a diagram illustrating an example configuration for managing an AV stream.

FIG. 8 is a diagram illustrating an example configuration for managing an AV stream with the playback apparatus 1.

As illustrated in FIG. 8, the management of an AV stream is performed by using two layers, which are PlayList and Clip. The AV stream may be recorded in a local storage of the playback apparatus 1, instead of on the optical disc 2. The Clip includes an AV stream, which is a TS that is obtained by multiplexing video data and audio data, and corresponding Clip Information (Clip Information including attribute information regarding the AV stream).

The AV stream is expanded along the time axis, and each access point is specified mainly as a time stamp in PlayList. The Clip Information is used, for example, to find an address in the AV stream from which decoding is to be started.

The PlayList is a collection of playback intervals of the AV stream. A playback interval in the AV stream is called a PlayItem. The PlayItem is represented by a pair of an IN point and an OUT point of the playback interval on the time axis. The PlayList includes one or a plurality of PlayItems.

The first PlayList from the left in FIG. 8 includes two PlayItems, and the two PlayItems respectively refer to the first half and the second half of the AV stream included in the Clip on the left side.

The second PlayList from the left includes one PlayItem, and the PlayItem refers to the entirety of the AV stream included in the Clip on the right side.

The third PlayList from the left includes two PlayItems, and the two PlayItems respectively refer to a part of the AV stream included in the Clip on the left side and a part of the AV stream included in the Clip on the right side.

For example, when the left PlayItem included in the first PlayList from the left is specified as an object to be played back by a disc navigation program, the first half of the AV stream that is included in the Clip on the left side, which is referred to by the PlayItem, is played back. In this way, the PlayList is used as playback control information for controlling playback of the AV stream.

In the PlayList, a playback path formed by a row of one or more PlayItems is called a Main Path (Main Path).

Moreover, in the PlayList, a playback path that is parallel to the Main Path and that is formed by a row of one or more SubPlayItems is called a Sub Path (Sub Path).

Figure 9:
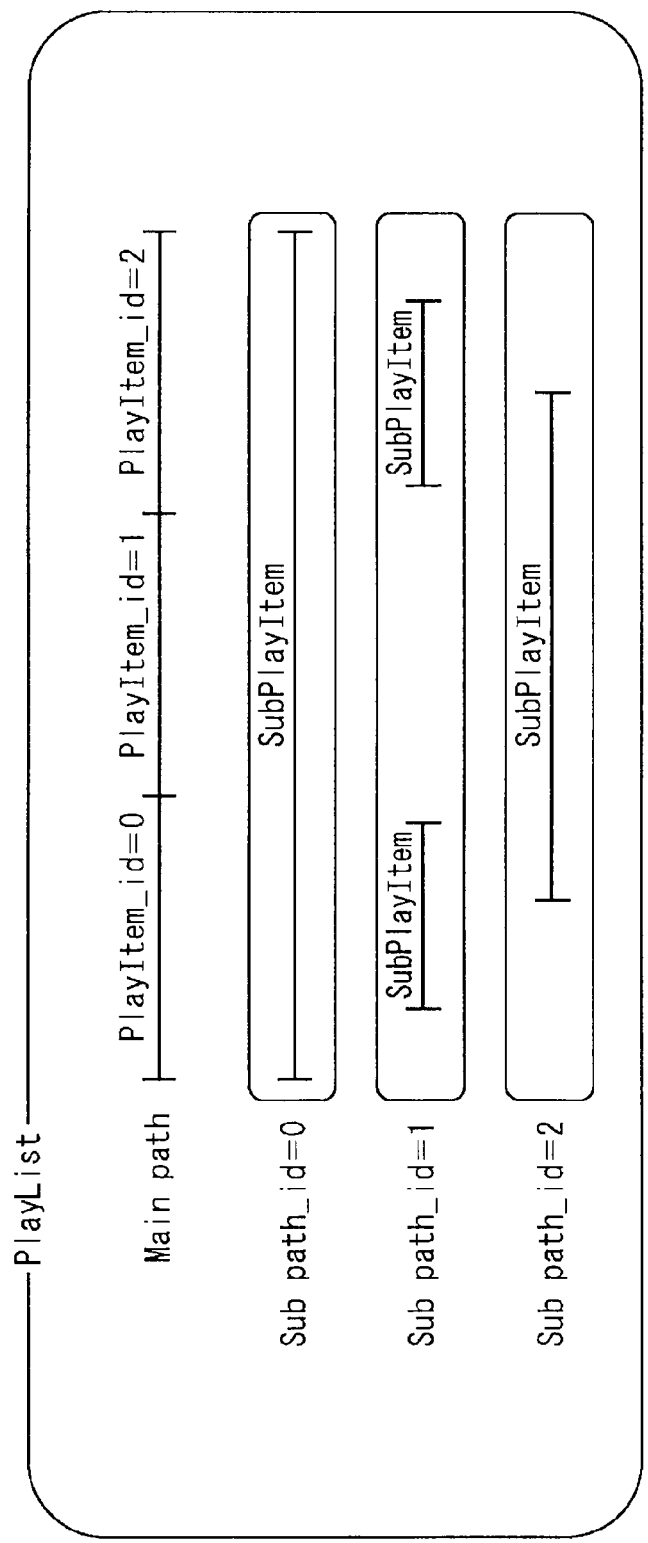
FIG. 9 is a diagram illustrating the structures of a Main Path and Sub Paths.

FIG. 9 is a diagram illustrating the structures of a Main Path and Sub Paths.

A PlayList can have one Main Path and one or more Sub Paths. The L video stream described above is referred to by PlayItems that are included in the Main Path. Moreover, the R video stream is referred to by SubPlayItems that are included in the Sub Paths (Sub Paths in Extension( ) described below).

The PlayList of FIG. 9 includes one MainPath, which includes three PlayItems, and three Sub Paths. An ID is assigned to each of the PlayItems included in the Main Path sequentially from the left. An ID is also assigned to each of the Sub Paths.

In the example of FIG. 9, the Sub Path having Subpath_id=0 includes one SubPlayItem, and the Sub Path having Subpath_id=1 includes two SubPlayItems. Moreover, the SubPath having Subpath_id=2 includes one SubPlayItem.

An AV stream to which a PlayItem refers and an AV stream to which a SubPlayItem that specifies a playback interval that overlaps the time interval of the PlayItem are played back synchronizingly. The management of an AV stream by using PlayList, PlayItem, and SubPlayItem is described, for example, in Japanese Unexamined Patent Application Publication No. 2008-252740 and Japanese Unexamined Patent Application Publication No. 2005-348314.

[Directory Structure]

Figure 10:
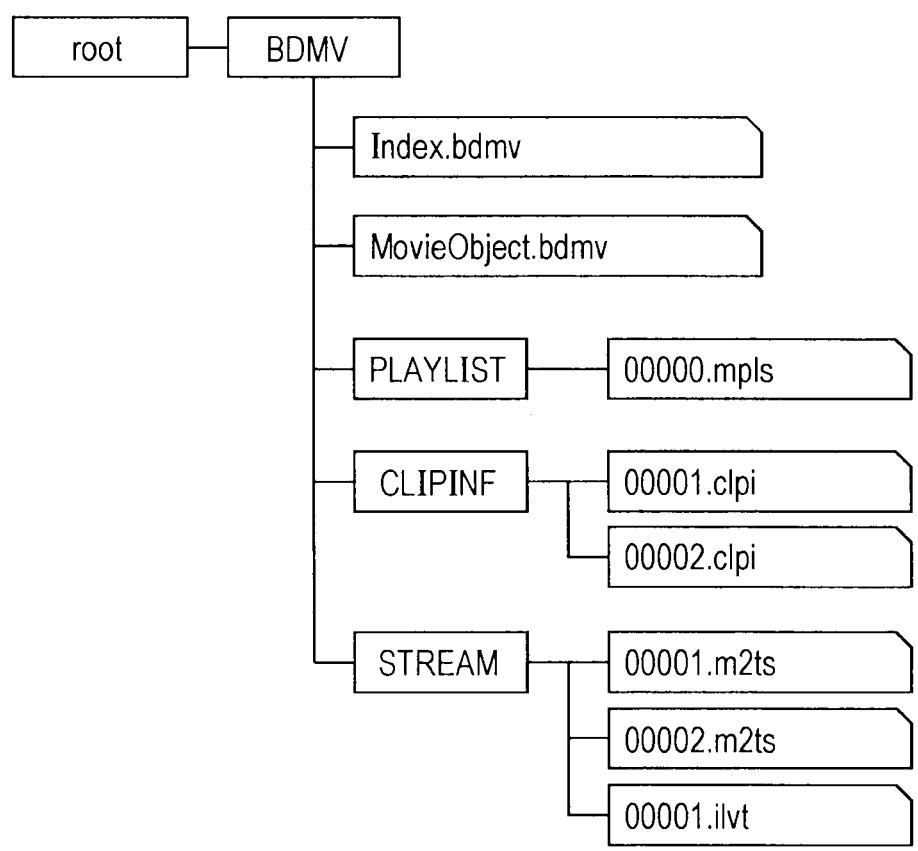
FIG. 10 is a diagram illustrating an example configuration for managing files that are recorded on an optical disc.

FIG. 10 is a diagram illustrating an example configuration for managing files that are recorded on the optical disc 2.

As illustrated in FIG. 10, the files are hierarchically managed using a directory structure. One root directory is made on the optical disc 2. Below the root directory is the range managed by one recording/playback system.

A BDMV directory is located under the root directory. An Index file, which is a file having a name "Index.bdmv", and a MovieObject file, which is a file having a name "MovieObject.bdmv" are stored right under the BDMV directory.

A PLAYLIST directory, a CLIPINF directory, a STREAM directory, and the like are created under the BDMV directory.

PlayList files, in which PlayLists are described, are stored in the PLAYLIST directory. Each PlayList file has a name that is a combination of a five-digit number and an extension ".mpls". The PlayList file illustrated in FIG. 10 has a filename "00000.mpls".

Clip Information files, in which Clip Information is described, are stored in the CLIPINF directory. Each Clip Information file has a name that is a combination of a five-digit number and an extension ".clpi".

Two Clip Information files in FIG. 10 respectively have filenames "00001.clpi" and "00002.clpi". Hereinafter, a Clip Information file will be called a clpi file, as appropriate.

The clpi file "00001.clpi" is a file in which information regarding a corresponding L video stream is described, and the clpi file "00002.clpi" is a file in which information regarding a corresponding R video stream is described.

Stream files are stored in the STREAM directory. Each stream file has a name that is a combination of a five-digit number and an extension ".m2ts" or a name that is a combination of a five-digit number and an extension ".ilvt". Hereinafter, a file having the extension ".m2ts" will be called an m2ts file, and a file having the extension ".ilvt" will be called an ilvt file, as appropriate.

The m2ts file "00001.m2ts" is a file for the L video stream, and the m2ts file "00002.m2ts" is a file for the R video stream.

The ilvt file "00001.ilvt" is a file for, when the m2ts file for the L video stream and the m2ts file for the R video stream are interleaved, managing these streams and performing 3D playback. Therefore, when the L video stream and the R video stream are included in one TS and the m2ts files thereof are not interleaved, the ilvt file is not recorded on the optical disc 2.

In addition to those illustrated in FIG. 10, a directory for storing files for an audio stream and the like are created under the BDMV directory.

In the example of FIG. 10, the filename of the m2ts file included in the Clip regarding the L video is "00001.m2ts", and the filename of the clpi file is "00001.clpi". Moreover, the filename of the m2ts file included in the Clip regarding the R video is "00002.m2ts", and the filename of the clpi file is "00002.clpi". The filenames of the m2ts file and the clpi file that are included in one Clip include the same number.

The filename of the ilvt file includes "00001", which is the same five-digit number as that included in each of the filenames of the m2ts file and the clpi file that are included in the Clip regarding the L video. Thus, the filename of an ilvt file to be specified when performing 3D playback can be identified from the filename of the clpi file included in the Clip regarding the L video.

[Syntax of Each Data Item]

FIG. 11 is a diagram illustrating the syntax of a PlayList file.

For convenience of description, line numbers and ":" are shown on the left side of FIG. 11. The line numbers and ":" are not included in the PlayList. Note that main statements of the PlayList will be described here and detailed description will be omitted. The details are described, for example, in Blu-ray Disc Read Only Format part 3.

yyyyy.mpls in the first line represents the filename of this PlayList file.

As illustrated in the second to fifth lines, the PlayList file is roughly divided into fields of AppInfoPlayList( ), PlayList( ), PlayListMark( ), and ExtensionData( ). In PlayListMark( ) in the fourth line, information regarding a mark, which is the destination of a jump due to a user operation that instructs a chapter jump or due to a command or the like, is described.

The seventh to eleventh lines are the field for AppInfoPlayList( ). As illustrated in the ninth line, AppInfoPlayList( ) includes MVC_flag, which is a one-bit flag representing whether or not the PlayList includes information regarding MVC playback (3D playback). MVC_flag may be included, instead of in the PlayList, in a stream such as a video stream.

FIG. 12 is a diagram illustrating the meaning of MVC_flag.

As illustrated in FIG. 12, the value 0 of MVC_flag means that the PlayList does not include information regarding 3D playback. That is, an optical disc on which a PlayList having MVC_flag=0 is recorded is a disc that is not capable of performing 3D playback.

The value 1 of MVC_flag means that the PlayList includes information regarding 3D playback.

In addition to MVC_flag, AppInfoPlayList( ) includes information regarding the type of the PlayList, such as information regarding whether the PlayList is that for performing random playback.

The twelfth to twenty-fifth lines are the field for PlayList( ). number_of_PlayItems in thirteenth line represents the number of PlayItems in the PlayList. In the example of FIG. 9, the number of PlayItems is three. The value of PlayItem_id is assigned from zero in the order of appearance of PlayItem( ) in the PlayList. In the for statement in the fifteenth to nineteenth lines, PlayItem( ) is referred to for the number of PlayItems.

number_of_SubPaths in the fourteenth line represents the number of Sub Paths in PlayList( ). In the example of FIG. 9, the number of Sub Paths is three. The value of SubPath_id is assigned from zero in the order of appearance of SubPath( ) in the PlayList( ). In the for statement in the twentieth to twenty-fourth lines, SubPath( ) is referred to for the number of Sub Paths.

The twenty-sixth to thirty-third lines are the description of PlayItem( ) included in PlayList( ). Clip_Information_file_name in the twenty-seventh line represents the name of a clpi file of a Clip including an AV stream to which the PlayItem refers.

MVC_file_type in the twenty-eighth line is 2-bit data that has an effective value when the value of MVC_flag is 1, and represents the type of a file from which each of the L video stream and the R video stream is supplied.

FIG. 13 is a diagram illustrating the meaning of MVC_file_type.

As illustrated in FIG. 13, the value 0 of MVC_file_type means that the L video stream and the R video stream are included in one TS, and the m2ts file for managing the TS is represented by Clip_Information_file_name.

As described above, the filename of an m2ts file and the filename of a clpi file included in one Clip include the same number. Clip_Information_file_name also represents the filename of a corresponding m2ts file that is included in the same as that including the clpi file having the filename.

The value 1 of MVC_file_type means that the m2ts file (first TS file) for the L video stream represented by Clip_Information_file_name and the m2ts file (second TS file) for the R video stream are interleaved on the optical disc 2. In this case, the L video stream and R video stream are included in different TSs.

The value 2 of MVC_file_type means that both or one of the m2ts file for the L video stream represented by Clip_Information_file_name and the m2ts file for the R video stream is recorded on a local storage in the playback apparatus 1.

The value 3 of MVC_file_type is a reserved value.

Referring back to FIG. 11, IN_time in the thirtieth line represents the start position of the playback interval of the PlayItem, and OUT_time in the thirty-first line represents the end position.

STN_table( ) in the thirty-second line includes information regarding an AV stream to which the PlayItem refers. For example, the information regarding the AV stream to which the PlayItem refers includes the stream number (ID) and the PID of a transport packet included in the L video stream.

The thirty-fourth to fortieth lines are the description of SubPath( ) included in PlayList( ). SubPath( ) in the thirty-fourth to fortieth lines includes information regarding video data excluding R video and information regarding audio data, which are played back together with the AV stream to which the PlayItem refers.

SubPath_type in the thirty-fifth line is 8-bit data representing the type of a Sub Path.

FIG. 14 is a diagram illustrating the meaning of SubPath_type.

As illustrated in FIG. 14, the type of SubPath is represented by values from 2 to 7. For example, SubPath_type=2 means that the SubPath is for audio data that is used to play back a slide show (Browsable slideshow), and SubPath_type=3 means that the SubPath is for data for displaying an interactive menu.

number_of_SubPlayItems in the thirty-sixth line of FIG. 11 is 8-bit data representing the number of SubPlayItems (the number of entries) included in one Sub Path( ). For example, the number_of_SubPlayItems of the SubPlayItem for which SubPath_id=0 in FIG. 9 is 1, and the number_of_SubPlayItems of the SubPlayItem for which SubPath_id=1 is 2. In the for statement in thirty-seventh to thirty-ninth lines, the SubPlayItem( ) is referred to for the number of SubPlayItems.

The forty-first to forty-fifth lines are the description of SubPlayItem( ) included in the SubPath( ). Clip_Information_file_name in the forty-second line represents the filename of a clpi file of a Clip to which the SubPlayItem refers.

SubPlayItem_IN_time in the forty-third line represents the start position of the playback interval of a SubPlayItem, and SubPlayItem_OUT_time in the forty-fourth line represents the end position.

The forty-sixth to forty-ninth lines are ExtensionData( ) which is an extended field.

When the value of MVC_flag is 1, SubPath_entries_extension( ) and STN_table_extension( ) are described in ExtensionData( ). SubPath_entries_extension( ) and STN_table_extension( ) include information regarding the R video stream that is used for 3D playback together with the L video stream to which the PlayItem refers.

In this way, information regarding the R video stream is described in the field for ExtensionData( ) instead of in the field for SubPath( ) (thirty-fourth line of FIG. 11), although the R video stream is managed as a stream to which SubPath refers.

If information regarding the R video stream is described in the field for SubPath( ) malfunction may occur when the description is read by a player that is not capable of performing 3D playback. Occurrence of such a malfunction can be prevented by describing the information regarding the R video stream as ExtensionData( ) and by making the description to be read only when a player that is capable of performing 3D playback performs 3D playback.

FIG. 15 is a diagram illustrating an example of the syntax of SubPath_entries_extention( ) included in Extension Data( ).

number_of_SubPath_extensions is 16-bit data representing the number of SubPath_extensions, i.e., the number of appearances of SubPath_extension( ) in SubPath_entries_extension( ). In the for statement following number_of_SubPath_extensions, SubPath_extension( ) is referred to for the number of SubPaths.

Here, an ID is also assigned to a SubPath that refers to the R video stream, as with a normal SubPath that refers to the video data other than the R video and the audio data and whose information is described in SubPath( ) in the thirty-fourth line of FIG. 11.

As illustrated in the for statement in FIG. 15, the ID of the SubPath that refers to the R video stream starts from a value that is the same as the value of number_of_SubPaths in the fourteenth line of FIG. 11 and incremented by one every time SubPath_extension( ) is referred to. For example, as illustrated in FIG. 9, when the number of the normal SubPaths is three and number_of_SubPaths=3, if number_of_SubPath_extensions is 2, 3 is assigned to the ID of the first SubPath and 4 is assigned to the ID of the second SubPath.

FIG. 16 is a diagram illustrating an example of the syntax of SubPath_extention( ) of FIG. 15.

length is 32-bit data representing the number of bytes from immediately after the length field to the end of Sub-Path_extension( ).

SubPath_type_extension, which is an extension of Sub-Path_type, is 8-bit data that represents the type of SubPath whose information is described in SubPath_extension( ).

FIG. 17 is a diagram illustrating the meaning of SubPath_type_extention.

As illustrated in FIG. 17, the values from 0 to 7 of SubPath_type_extension respectively represent the same meanings as those from 0 to 7 of SubPath_type in FIG. 14.

The value 8 of SubPath_type_extension means that the SubPath having SubPath_type_extension=8 is a SubPath that refers to the R video stream. Moreover, it also means that the m2ts file for the R video stream that is referred to is a file that is different from the m2ts file for the L video stream to which the PlayItem refers.

Referring back to FIG. 16, number_of_SubPlayItems is 8-bit data representing the number of SubPlayItems in SubPath_extension( ). In the for statement following number_of_SubPlayItems, SubPlayItem( ) is referred to for the number of SubPlayItems.

The description of SubPlayItem( ) in SubPath_extension( ) is the same as the description of SubPlayItem( ) in the forty-first to forty-fifth lines of FIG. 11.

That is, SubPlayItem( ) in SubPath_extension( ) includes Clip_Information_file_name that represents the filename of a clpi file included in the same Clip as the R video stream to which the SubPlayItem refers. Moreover, SubPlayItem_IN_time that represents the start position of a playback interval and SubPlayItem_OUT_time that represents the end position are included.

FIG. 18 is a diagram illustrating an example of the syntax of STN_table_extention( ) included in ExtensionData( ).

As described above, STN_table (the thirty-second line in FIG. 11) includes the PID of a transport packet included in the L video stream to which the PlayItem refers. In contrast, STN_table_extension( ) includes the PID of a transport packet included in the R video stream to which the SubPath (SubPath_extension) refers.

As illustrated in FIG. 18, following length that represents the length of STN_table_extension( ), STN_table_extension( ) includes, as information regarding the R video stream, stream_entry( ) and stream_attributes( ) that is attribute information regarding the R video stream.

FIG. 19 is a diagram illustrating an example of the syntax of stream_entry( ).

As illustrated in FIG. 19, following length that represents the length of stream_entry( ) stream_entry( ) includes type that is 8-bit information.

For example, the value 1 of type means that the R video stream is included in one TS together with the L video stream to which the PlayItem refers. Moreover, the value 2 of type at least means that the R video stream is included in a TS that is different from that of L video stream to which the PlayItem refers.

When the value of type is 1, ref_to_stream_PID_of_mainClip is referred to. ref_to_stream_PID_of_mainClip represents the PID of a transport packet included in the R video stream that is included in one TS together with the L video stream.

When the value of type is 2, ref_to_SubPath_id, ref_to_subClip_entry_id, and ref_to_stream_PID_of_subClip are referred to. Out of the three information items, ref_to_SubPath_id represents the ID of a SubPath (SubPath_extension) that refers to the R video stream. Moreover, ref_to_stream_PID_of_subClip represents the PID of a transport packet included in the R video stream that is referred to by a SubPath that is identified by ref_to_SubPath_id.

Figure 20:
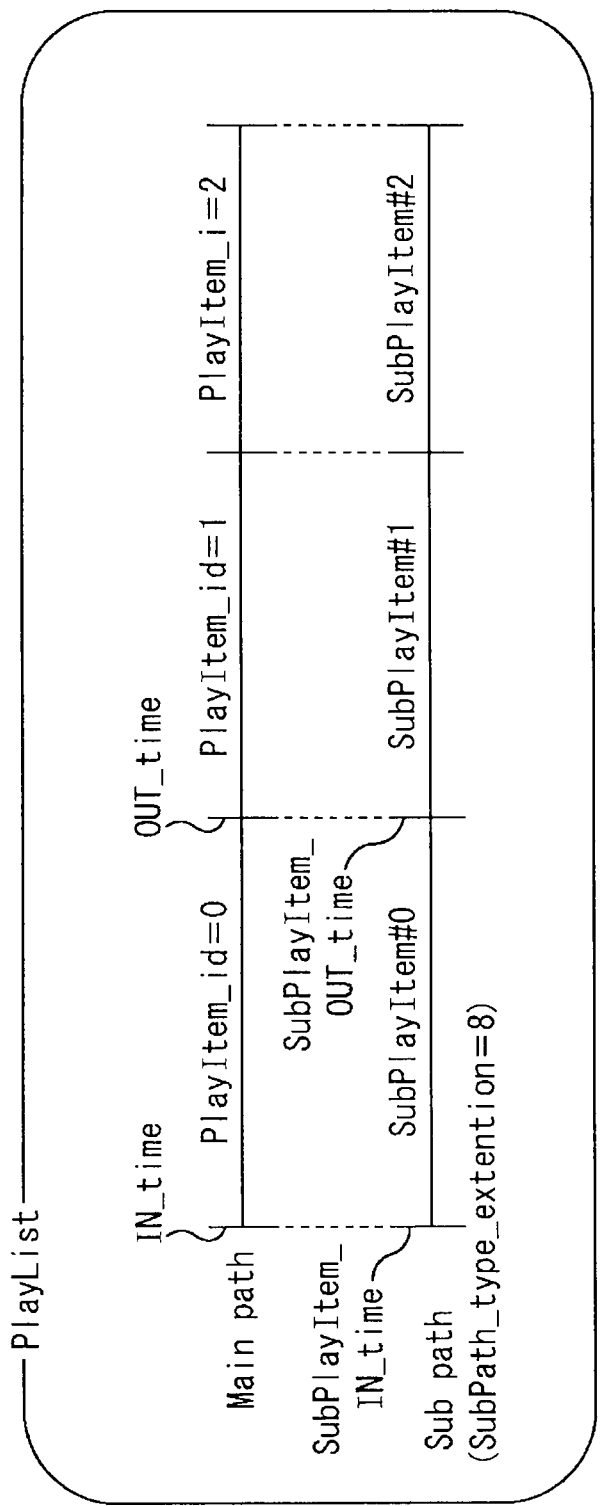
FIG. 20 is a diagram illustrating the relationship between PlayItem and SubPlayItem.

FIG. 20 is a diagram illustrating the relationship between a SubPath that refers to the R video stream and has SubPath_type_extention=8 and a MainPath that refers to the L video stream and with which the SubPath is associated in the PlayList.

As described above, each PlayItem( ) includes IN_time that represents the start position of the playback interval of the PlayItem and OUT_time that represents the end position (the thirtieth and thirty-first lines in FIG. 11).

Moreover, as described above, SubPlayItem( ) in SubPath_extension( ) includes, for each SubPlayItem included in the SubPath that refers to the R video stream, SubPlayItem_IN_time that represents the start position of the playback interval and SubPlayItem_OUT_time that represents the end position.

As illustrated in FIG. 20, the start position and the end position of a PlayItem are respectively the same as the start position and the end position of a SubPlayItem that refers to the R video stream that is associated with the L video stream to which the PlayItem refers.

For example, IN_time and OUT_time of a PlayItem to which PlayItem_id=0 is assigned are respectively the same as SubPlayItem_IN_time and SubPlayItem_OUT_time of SubPlayItem#0 that is associated with the PlayItem to which PlayItem_id=0 is assigned.

As heretofore described, in the PlayList, SubPath( ) which is the field in which information regarding SubPath is described, is defined as SubPath_extension( ) in ExtensionData( ) which is an extended field, and STN_table( ) which is the field in which information regarding the stream number (STream Number) is described, is defined as STN_table_extension( ).

[Example Configuration of Playback Apparatus 1]

Figure 21:
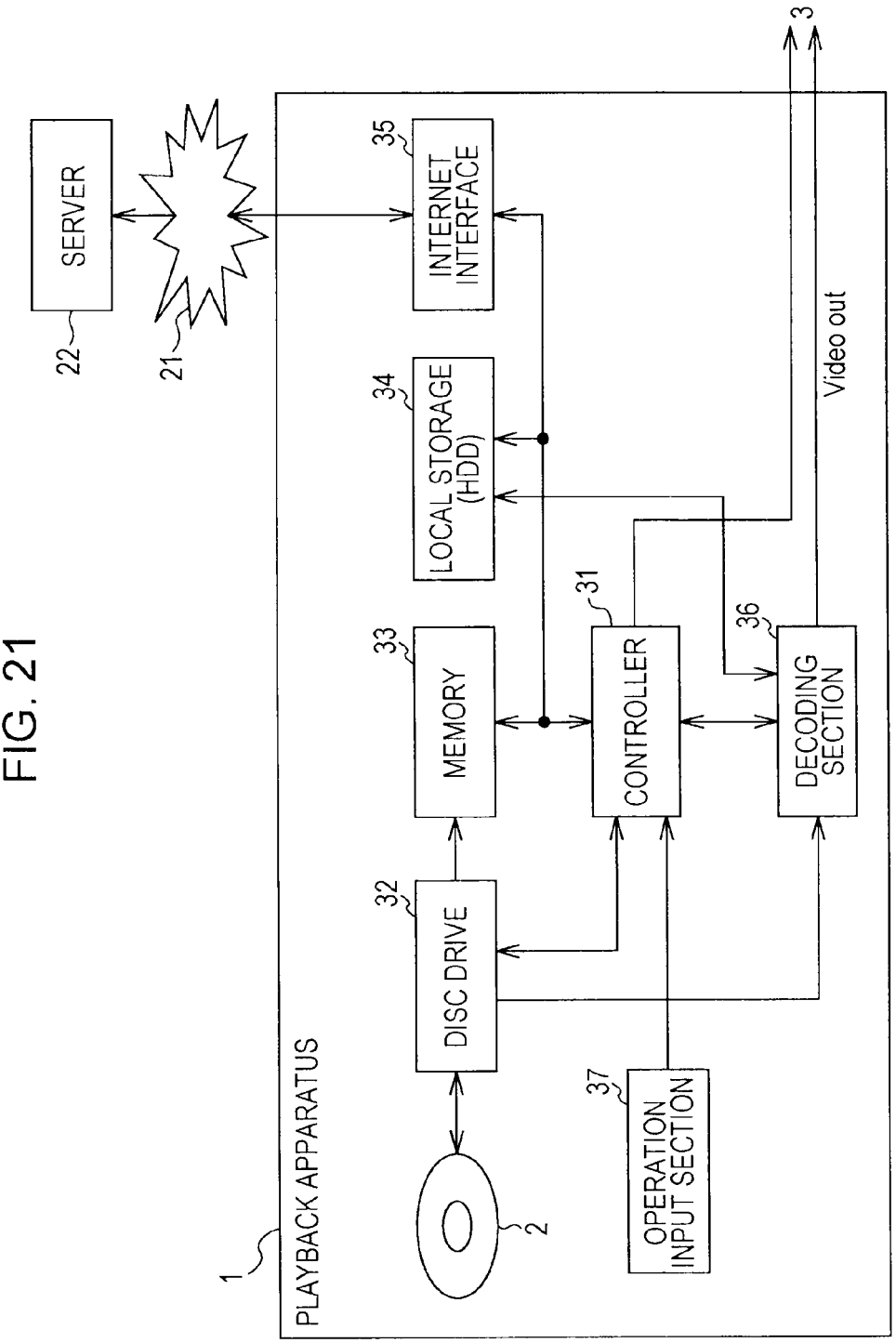
FIG. 21 is a block diagram illustrating an example configuration of a playback apparatus.

FIG. 21 is a block diagram illustrating an example configuration of the playback apparatus 1.

A controller 31 executes a control program, which is prepared beforehand, and controls the overall operation of the playback apparatus 1.

A disc drive 32 reads data from the optical disc 2 under the control by the controller 31, and outputs the read data to the controller 31, a memory 33, or a decoding section 36.

The memory 33 stores data that is necessary for the controller 31 to perform various processing and the like, as appropriate.

A local storage 34 includes, for example, an HDD (Hard Disk Drive). In the local storage 34, an R video stream, which is downloaded from a server 22, and the like are recorded. A stream that is recorded in the local storage 34 is also supplied to the decoding section 36 as appropriate.

An Internet interface 35 communicates with the server 22 through a network 21 under the control by the controller 31, and supplies data that is downloaded from the server 22 to the local storage 34.

Data for updating data recorded on the optical disc 2 is downloaded from the server 22. As will be described below, 3D playback of content can also be performed by using an R video stream that is downloaded together with an L video stream that is recorded on the optical disc 2.

The decoding section 36 decodes a stream that is supplied from the disc drive 32 or from the local storage 34, and outputs a decoded video signal to the display apparatus 3. An audio signal is also output to the display apparatus 3 along a predetermined path.

An operation input section 37 includes input devices, such as a button, a key, a touch panel, mouse, and the like; and a receiver that receives a signal such as infrared radiation, which is transmitted by a predetermined remote commander. The operation input section 37 detects a user operation, and supplies a signal representing the content of the detected operation to the controller 31.

FIG. 22 is a diagram illustrating an example configuration of the decoding section 36.

A separation unit 51 separates data, which is supplied from the disc drive 32, into Main TS data and Sub TS data under the control by the controller 31.

The separation unit 51 outputs the Main TS data, which has been separated, to a read buffer 52 and makes the Main TS data stored, and outputs the Sub TS data to a read buffer 55 and makes the Sub TS data stored. Moreover, the separation unit 51 outputs the Sub TS data, which has been supplied from the local storage 34, to the read buffer 55 and makes the data stored.

A PID filter 53 distributes the transport packets of the Main TS, which is constituted by data stored in the read buffer 52, on the basis of the PID. The controller 31 specifies the PID of a transport packet included in the L video stream, which is identified on the basis of STN_table( ) of the PlayList (the thirty-second line of FIG. 11) and the PID of a transport packet included in the R video stream, which is identified on the basis of ref_to_stream_PID_of_mainClip (FIG. 19) of STN_table_extension( ).

The PID filter 53 reads the transport packet of the L video stream from the read buffer 52, outputs the transport packet to an ES buffer 54, and makes the transport packet stored. The ES buffer 54 stores an ES (Elementary Stream) of the L video.

Moreover, when the R video stream is multiplexed in the Main TS together with the L video stream, the PID filter 53 extracts the transport packet of the R video stream on the basis of the PID and outputs the transport packet to a switch 57.

A PID filter 56 reads the transport packet of the R video stream included in the Sub TS from the read buffer 55, and outputs the transport packet to the switch 57. The controller 31 specifies the PID of a transport packet that is identified on the basis of ref_to_stream_PID_of_subClip (FIG. 19) of STN_table_extension( ) and that is included in the R video stream.

Here, tasks for processing the L video and R video streams are described. However, as has been described with reference to FIG. 5, graphics data such as PG and IG may be multiplexed in the Main TS. Likewise, graphics data such as PG and IG may be multiplexed in the Sub TS.

The PID filter 53 and the PID filter 56 also distribute such data on the basis of the PID as necessary, and outputs the data to predetermined output destinations. A decoder that decodes graphic data and the like are connected to the output terminals (circles) illustrated in the blocks for the PID filter 53 and the PID filter 56 in FIG. 22.

The switch 57 outputs the transport packet of the R video stream, which is supplied from the PID filter 53 and which has been included in the Main TS, to an ES buffer 58 and makes the transport packet stored. Moreover, the switch 57 outputs the transport packet of the R video stream, which is supplied from the PID filter 56 and which has been included in the Sub TS, to the ES buffer 58 and makes the transport packet stored. The ES buffer 58 stores an ES of the R video.

A switch 59 outputs a packet to be decoded to a decoder 60 out of the packets for the L video stored in the ES buffer 54 and the packets for the R video stored in the ES buffer 58. Information regarding time such as DTS (Decoding Time Stamp) and the like are set in PES packets of the L video and the R video, and reading from the buffer is performed on the basis of the information regarding time.

The decoder 60 decodes the packet supplied from the switch 59, and outputs an L video or R video signal that has been obtained by the decoding.

[Specific Example 1 of PlayList File]

FIG. 23 is a diagram illustrating a specific example of a PlayList file.

FIG. 23 illustrates a part of the information illustrated in FIG. 11 and the like. The same applies to specific examples of PlayList file described below.

The PlayList file of FIG. 23 is a PlayList file for controlling 3D playback when the L video stream and the R video stream are included in different TSs and the TS files are interleaved and recorded on the optical disc 2.

That is, MVC_flag=1 as described in AppInfoPlayList( ) of FIG. 23, and MVC_file_type=1 as described in PlayItem( ).

Clip_Information_file_name of PlayItem( ) is "00001". A clpi file included in the Clip for the L video is identified from this description. Moreover, the start position and the end position of the playback interval of PlayItem are respectively identified from IN_time and OUT_time of the PlayItem( ) and the PID of a transport packet included in the L video stream is identified from STN_table( ).

Information regarding a SubPath that refers to the R video stream is described in ExtensionData( ). In this example, it is assumed that the number of normal SubPaths is 0 (the value of number_of_SubPaths (the fourteenth line of FIG. 11) is 0) and SubPath_id=0 is assigned to a SubPath that refers to the R video stream. SubPath_type_extension=8, which means that the SubPath refers to the R video stream, is set in SubPath_extension( ).

Clip_Information_file_name of SubPlayItem( ) of ExtensionData( ) is "00002". The clpi file included in the Clip for the R video is identified from this description. Moreover, the start position and the end position of the playback interval of a SubPlayItem are respectively identified from SubPlayItem_IN_time and SubPlayItem_OUT_time of SubPlayItem( ).

That the ID of a SubPath that refers to the R video stream is 0 (ref_to_SubPath_id=0) and the PID (ref_to_R_ video_PID) of the transport packet included in the R video stream are identified from STN_table_extension( ). In this example, the value of type of STN_table_extension( ) is 2.

FIG. 24 is a diagram illustrating the syntax of a clpi file.

Part A of FIG. 24 is a diagram illustrating an example of the clpi file "00001.clpi".

number_of_source_packets1 represents the number of source packets included in the m2ts file "00001.m2ts".

EP_map includes information regarding the position of an entry point (EP) that is set in the TS included in the m2ts file "00001.m2ts".

chunk_map( ) includes information regarding the positions of the chunks of the m2ts file "00001.m2ts". The position of each chunk is represented by, for example, a Source Packet Number (SPN). A specific example of chunk_map( ) will be described below.

Part B of FIG. 24 is a diagram illustrating an example of a clpi file "00002.clpi".

As with the clpi file "00001.clpi", the clpi file "00002.clpi" includes number_of_source_packets2, which represents the number_of_source_packets included in the m2ts file "00002.m2ts", EP_map, and chunk_map( ).

Figure 25:
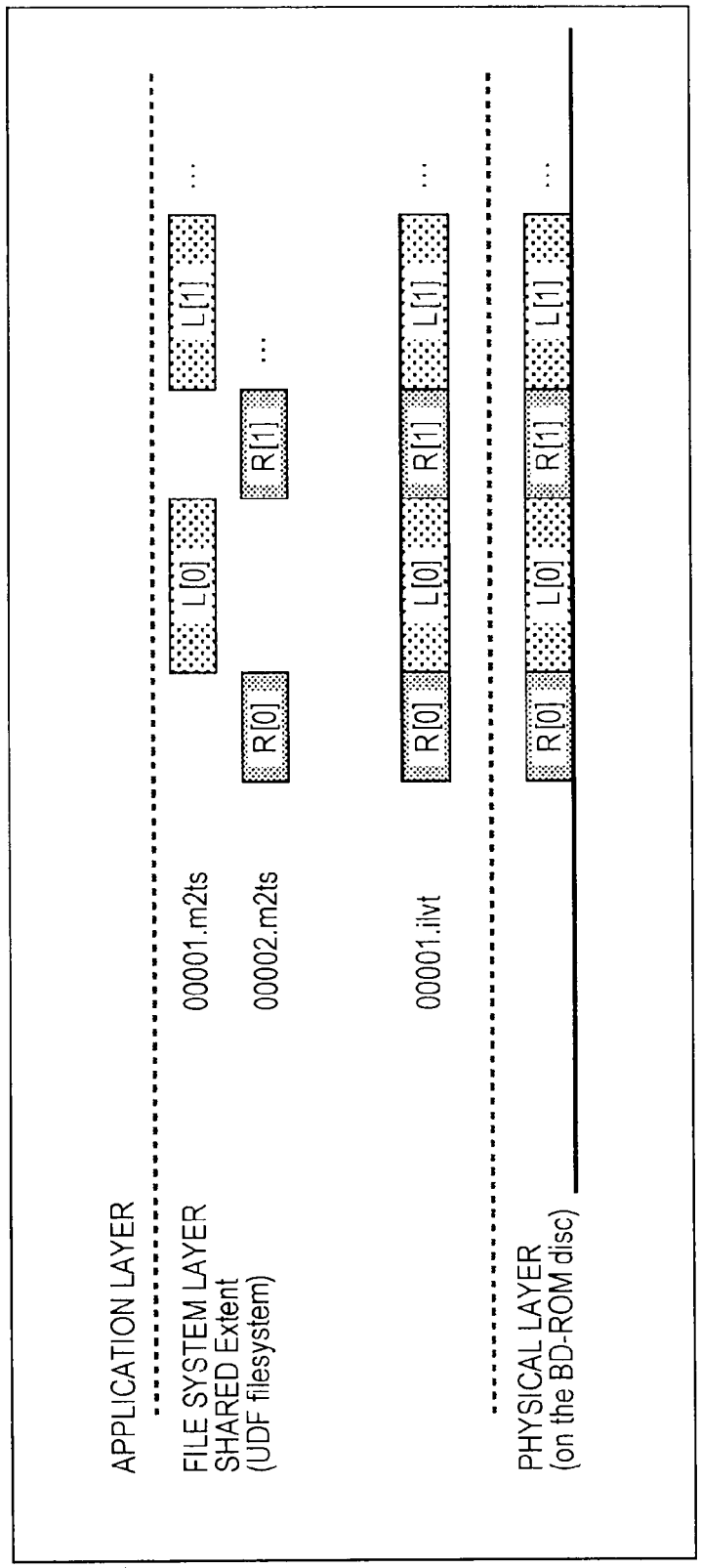
FIG. 25 is a diagram illustrating the concept of file management.

FIG. 25 is a diagram illustrating the concept of file management.

As illustrated in FIG. 25, management of files that are interleaved and recorded on the optical disc 2 is performed in the form of three layers including a physical layer, a file system layer, and an application layer. The PlayList file of FIG. 23 and the clpi file of FIG. 24 are information for the application layer, which is handled by an application that manages playback of content.

The physical layer is a layer of the optical disc 2 on which the m2ts file for the L video stream and the m2ts file for the R video stream are interleaved and recorded.

In the file system layer, stream files (an m2ts file and an ilvt file) that are specified by the application and the positions of extents on the optical disc 2, the extents being included in the stream files, are made to correspond to each other. The file system is, for example, a UDF file system.

An extent is a collection of data items that are included in data managed by a specific file and that are sequentially arranged on the optical disc 2.

That is, in the example illustrated in FIG. 25, each of L[0] and L[1] is an extent in the m2ts file "00001.m2ts". When the m2ts file "00001.m2ts" is specified by the application as a file to be read, the positions of L[0] and L[1] on the optical disc 2 are identified by the UDF file system and read by the disc drive 32.

In the m2ts file "00002.m2ts", each of R[0] and R[1] is an extent. When the m2ts file "00002.m2ts" is specified by the application as a file to be read, the positions of R[0] and R[1] on the optical disc 2 are identified by the UDF file system and read by the disc drive 32.

In the ilvt file "00001.ilvt", the entirety of R[0], L[0], R[1], and L[1] is one extent. When the ilvt file "00001.ilvt" is specified by the application as a file to be read, the positions of R[0], L[0], R[1], and L[1] on the optical disc 2 are identified by the UDF file system and read by the disc drive 32.

Operation Example 1

Figure 26:
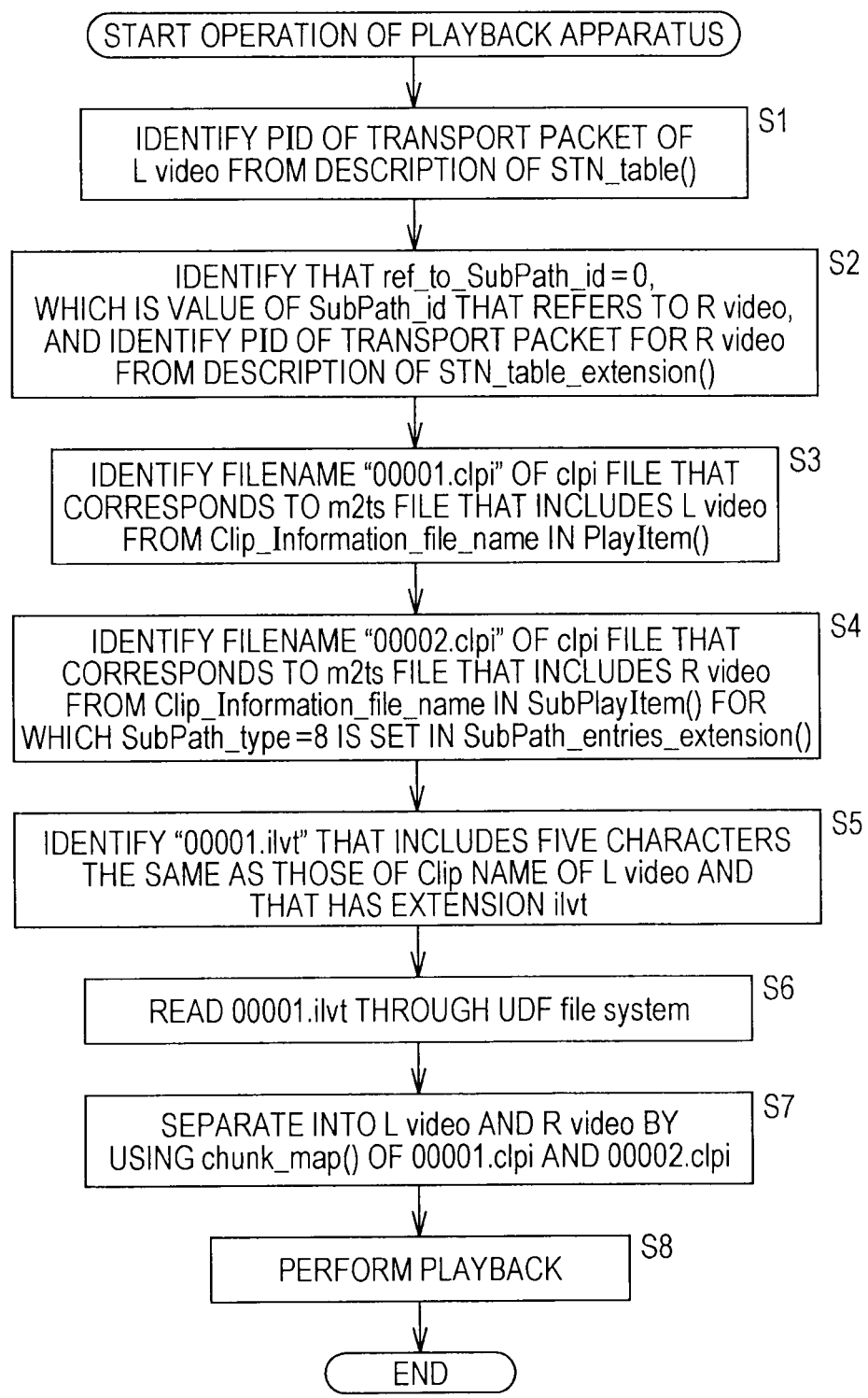
FIG. 26 is a flowchart illustrating a playback process that is performed in accordance with the PlayList file of FIG. 23.

Here, referring to the flowchart of FIG. 26, the process of 3D playback that is performed in accordance with the PlayList file of FIG. 23 will be described.

If MVC_flag=1, the controller 31 (the application for managing playback of content executed by the controller 31) starts 3D playback in accordance with a user operation performed on the operation section 37.

In step S1, the controller 31 identifies the PID of the transport packet of the Main TS included in the L video stream from the description of STN_table( ).

In step S2, the controller 31 identifies ref_to_Sub-Path_id=0, which is the value of SubPath_id of the SubPath that refers to the R video stream, from the description of STN_table_extension( ) and identifies the PID of the transport packet of the Sub TS included in the R video stream.

In step S3, the controller 31 identifies the filename of the clpi file that corresponds to the m2ts file of the Main TS that includes the L video stream as "00001.clpi" from Clip_Information_file_name in PlayItem( ).

In step S4, the controller 31 identifies the filename of the clpi file that corresponds to the m2ts file that includes the R video stream as "00002.clpi" from Clip_Information_file_name in SubPlayItem( ) of the SubPath to which SubPath_type=8 is set and for which SubPath_id=0 in SubPath_entries_extension( ).

In step S5, the controller 31 identifies the ilvt file "00001.ilvt", whose filename includes the extension ilvt and five characters that are the same as the number (00001) included in the filename of a file included in Clip for the L video. As described above, the filename of an ilvt file includes the same number as that of the filenames of the m2ts file and the clpi file included in the Clip for the L video.

In step S6, the controller 31 determines that "00001.ilvt", which is identified in step S3, is the file to be read, and causes the disc drive 32 to read the file from the optical disc 2 through the UDF file system. L video stream and the R video stream data, which has been read as data of the ilvt file "00001.ilvt" by the disc drive 32, is supplied to the separation unit 51 of the decoding section 36.

Note that, when a random access or the like has been specified and therefore decoding is started from a predetermined EP included in EP_map, data on and after the EP is read from the file to be read. EP_map includes information regarding the positions of source packets for specifying the positions of EPs and the like.

In step S7, the controller 31 controls the separation unit 51 to separate the data read from the optical disc 2 into L video data and R video data on the basis of chunk_map( ) of the clpi file "00001.clpi" and chunk_map( ) of the clpi file "00002.clpi".

The L video stream data, which has been separated by the separation unit 51, is output to the read buffer 52, and the R video stream data is output to the read buffer 55. Separation of data, which is performed by using chunk_map( ) will be described below.

The transport packet of the L video stream data stored in the read buffer 52 is extracted by the PID filter 53 on the basis of the PID that is identified in step S1, and is supplied to the decoder 60 through the ES buffer 54 and the switch 59. The transport packet of the R video stream data stored in the read buffer 55 is extracted by the PID filter 56 on the basis of the PID that is identified in step S2, and is supplied to the decoder 60 through the switch 57, the ES buffer 58, and the switch 59.

In step S8, the decoder 60 decodes (plays back) the packets that are successively supplied from the switch 59.

When the L video stream and the R video stream are included in different TSs and the TS files are interleaved and recorded on the optical disc 2, 3D playback is performed as heretofore described.

[Separation of Data by Using chunk_map( )]

FIG. 27 is a diagram illustrating an example of the syntax of chunk_map( ).

number_of_chunks represents the number of chunks that are referred to. On and after number_of_chunks, information regarding chunks is described for the number of chunks that is specified here.

SPN_chunk_start[i] represents the SPN (Source Packet Number) (length) from a reference position to the start position of each of the chunks, the reference position being, for example, the start position of the first chunk. The SPNs for the start positions of the chunks are described sequentially from that of the first chunk.

FIG. 28 is a diagram illustrating a specific example of a clpi file including chunk_map( ).

Part A of FIG. 28 is a diagram illustrating the clpi file "00001.clpi", and number_of_source_packets is "number_of_source_packets1". Moreover, number_of_chunks of chunk_map( ) is n+1, and SPN_chunk_start[i] are 0, a1, a2, . . . an.

Figure 29:
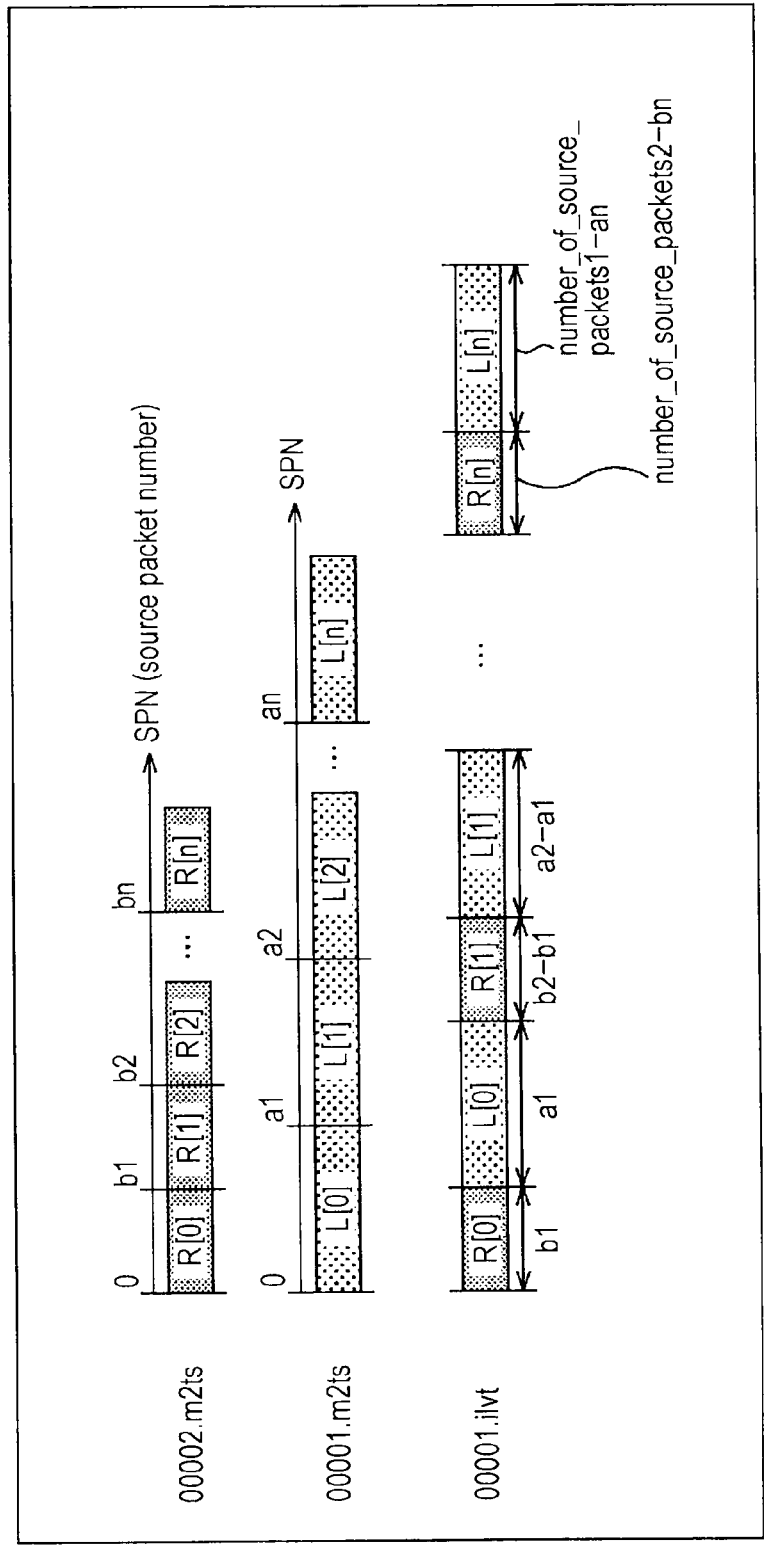
FIG. 29 is a diagram illustrating an example of data separation.

The first value 0 of SPN_chunk_start[i] means that, as illustrated in the middle part of FIG. 29, assuming that the start position of the first chunk of the m2ts file "00001.m2ts" is the reference, the SPN from the reference position to the start position of the first chunk L[0] is 0.

The second value a1 means that the SPN from the reference position to the start position of the second chunk L[1] is a1.

The third value a2 means that the SPN from the reference position to the start position of the third chunk L[2] is a2.

The (n+1)-th value an means that the SPN from the reference position to the start position of the last chunk L[n] is an.

Part B of FIG. 28 is a diagram illustrating the clpi file "00002.clpi", and number_of_source_packets is "number_of_source_packets2". Moreover, number_of_chunks of chunk_map( ) is n+1, and SPN_chunk_start[i] are 0, b1, b2, . . . , bn.

The first value 0 of SPN_chunk_start[i] means that, as illustrated in the upper part of FIG. 29, assuming that the start position of the first chunk of the m2ts file "00002.m2ts" is the reference, the SPN from the reference position to the start position of the first chunk R[0] is 0.

The second value b1 means that the SPN from the reference position to the start position of the second chunk R[1] is b1.

The third value b2 means that the SPN from the reference position to the start position of the third chunk R[2] is b2.

The (n+1)-th value bn means that the SPN from the reference position to the start position of the last chunk R[n] is bn.

As illustrated in the lower part of FIG. 29, when data read by the optical disc 2 is supplied, the separation unit 51 separates data corresponding to the SPN b1 from the start point of the supplied data as R[0] on the basis of the description of two chunk_map( ). When the ilvt file "00001.ilvt" is specified as the file to be read, data items are supplied to the separation unit 51 in the order of R[0], L[0], R[1], L[1], . . . , R[n], L[n].

Moreover, the separation unit 51 separates data corresponding to the SPN a1 from the end position of R[0] as L[0], and separates data corresponding to an SPN b2-b1 from the end position of L[0] as R[1]. The separation unit 51 separates data corresponding to an SPN a2-a1 from the end position of R[1] as L[1].

Likewise, the separation unit 51 separates data corresponding to an SPN that is the difference between the value of number_of_source_packets2 described in the clpi file "00002.clpi" and bn from the end position of L[n-1] as R[n]. The separation unit 51 separates data corresponding to an SPN that is the difference between the value of number_of_source_packets1 described in the clpi file "00001.clpi" and an from the end position of R[n] as L[n].

In this way, separation of data by the separation unit 51 is performed by using information regarding the lengths of the chunks described in chunk_map( ).

When a value other than 1 is set as MVC_file_type, chunk_map( ) is optional (may be present or absent). When a player reads a PlayList having a value other than 1 as MVC_file_type and if the PlayList includes chunk_map( ) the player should ignore the chunk_map( ).

When MVC_file_type=1, two corresponding streams including an L video stream and an R video stream are respectively divided into the same number of chunks. For R[i] and L[i] that are interleaved, the chunk for the L video stream and the chunk for the R video stream having the same index i have the same playback time.

FIG. 30 is a diagram illustrating the syntax of EP_map( ) described in a clpi file.

EP_map( ) is referred to for identifying the start position of decoding when performing a random access or the like. number_of_EP_entries represents the number of EPs (entry points).

The description on and after number_of_EP_entries is prepared for each EP. PTS_EP_start[i] represents the PTS of EP, and SPN_EP_start[i] represents the SPN of EP. In this way, the PTS and the SPN for each entry point are registered in the EP_map so as to correspond to each other. When an EP is specified, the read start address is identified on the basis of PTS_EP_start[i] and SPN_EP_start[i] of the specified EP, and the file is read.

[Specific Example 2 of Playlist File]

Part A of FIG. 31 is a diagram illustrating another specific example of a PlayList file.

The PlayList in part A of FIG. 31 is a PlayList for controlling 3D playback when the L video stream and the R video stream are included in the same TS. That is, the m2ts file for the L video stream and the m2ts file for the R video stream are not interleaved on the optical disc 2.

In this case, MVC_flag=1 as described in AppInfoPlayList( ) in part A of FIG. 31, and MVC_file_type=0 as described in PlayItem( ).

Clip_Information_file_name of PlayItem( ) is "00001". The clpi file included in the Clip for the L video is identified from this description. Moreover, the start position and the end position of the playback interval of the PlayItem are respectively identified from IN_time and OUT_time of PlayItem( ) and the PID of the transport packet included in the L video stream is identified from STN_table( ).

The PID of the transport packet included in the R video stream is identified from STN_table_extension( ) of ExtensionData( ). In the case of this example, the value of type of STN_table_extension( ) is 1.

Part B of FIG. 31 is a diagram illustrating the syntax of the clpi file "00001.clpi".

As illustrated in part B of FIG. 31, the clpi file "00001.clpi" includes EP_map. In this example, a value other than 1 is set for MVC_file_type, and the clpi file does not include chunk_map( ).

Figure 32:
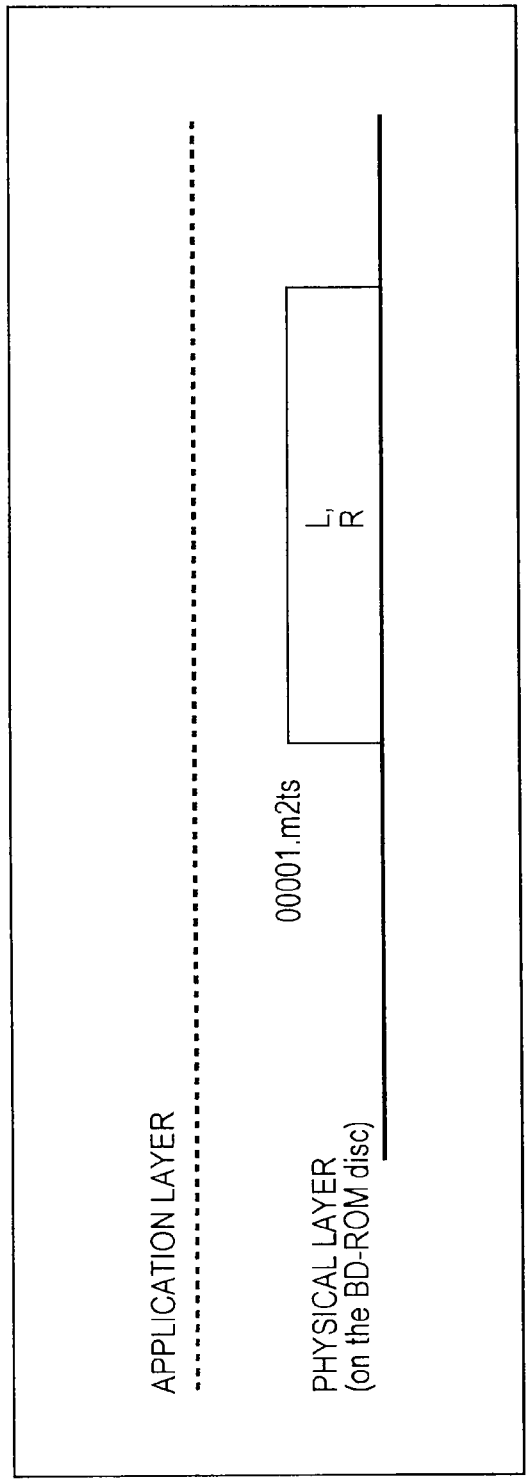
FIG. 32 is a diagram illustrating the concept of file management.

FIG. 32 is a diagram illustrating the concept of file management that is performed on the basis of the file illustrated in FIG. 31.

As illustrated in FIG. 32, one TS that includes the L video stream and the R video stream is managed by the m2ts file "00001.m2ts".

When an application specifies the m2ts file "00001.m2ts" as the file to be read, the position at which the m2ts file "00001.m2ts" is recorded is identified by the UDF file system and the file is read by the disc drive 32. Transport packets for each of the L video stream and the R video stream included in the read m2ts file "00001.m2ts" are separated on the basis of the PID.

Operation Example 2

Figure 33:
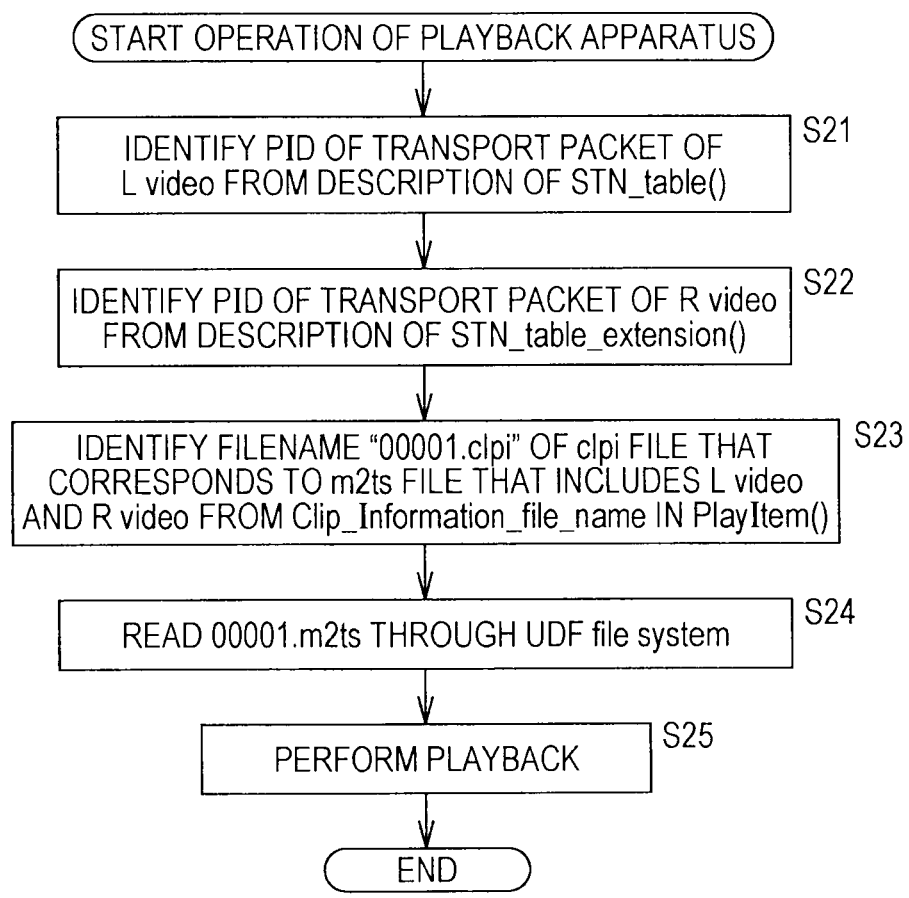
FIG. 33 is a flowchart illustrating a playback process that is performed in accordance with the PlayList file of FIG. 31.

Referring to the flowchart of FIG. 33, the process of 3D playback that is performed in accordance with the PlayList file illustrated in FIG. 31 will be described.

In step S21, the controller 31 identifies the PID of the transport packet of the Main TS included in the L video stream from the description of STN_table( ).

In step S22, the controller 31 identifies the PID of the transport packet of the Main TS included in the R video stream from the description of STN_table_extension( ).

In step S23, the controller 31 identifies the filename of the clpi file that corresponds to the m2ts file including the L video stream and the R video stream as "00001.clpi" from Clip_Information_file_name in PlayItem( ). Because MVC_flag=1 and MVC_file_type=0, it has been identified that the L video stream and the R video stream are included in one Main TS.

In step S24, the controller 31 determines that "00001.m2ts" is the file to be read, and causes the disc drive 32 to read the file from the optical disc 2 through the UDF file system. Data of the m2ts file "00001.m2ts" read by the disc drive 32 is supplied to the read buffer 52 through the separation unit 51 and stored.

The transport packet of the L video stream is extracted from the data stored in the read buffer 52 by the PID filter 53 on the basis of the PID identified in step S21. The data for the extracted transport packet is supplied to the decoder 60 through the ES buffer 54 and the switch 59.

Moreover, the transport packet of the R video stream is extracted from the data stored in the read buffer 52 by the PID filter 53 on the basis of the PID identified in step S22. The data for the extracted transport packet is supplied to the decoder 60 through the switch 57, the ES buffer 58, and the switch 59.

In step S25, the decoder 60 decodes (plays back) the packets that are successively supplied from the switch 59.

When the L video stream and the R video stream are included in the same TS, 3D playback is performed as heretofore described.

[Specific Example 3 of PlayList File]

FIG. 34 is a diagram illustrating still another example of a PlayList file.

The PlayList file illustrated in FIG. 34 is a PlayList for controlling 3D playback when a TS including the L video stream is recorded on the optical disc 2 and a TS including the R video stream is recorded in the local storage 34. For example, when the R video stream is downloaded from the server 22, a PlayList recorded on the optical disc 2 is updated so that information regarding the R video stream is added, is recorded in the local storage 34, and is managed by the controller 31.

MVC_flag=1 as described in AppInfoPlayList( ) in FIG. 34, and MVC_file_type=2 as described in PlayItem( ).

Clip_Information_file_name of PlayItem( ) is "00001". The clpi file included in the Clip for the L video is identified from this description. Moreover, the start position and the end position of the playback interval of the PlayItem are respectively identified from IN_time and OUT_time of PlayItem( ) and the PID of the transport packet included in the L video stream is identified from STN_table( ).

Information regarding a SubPath that refers to the R video stream is described in ExtensionData( ). Also in this example, the number of normal SubPaths is 0 (the value of number_of_SubPaths (the fourteenth line of FIG. 11) is 0), and SubPath_id=0 is assigned to the SubPath that refers to the R video stream. As illustrated in FIG. 34, SubPath_type_extension=8, which means that the SubPath refers to the R video stream, is set in SubPath_extension( ).

Clip_Information_file_name of SubPlayItem( ) of ExtensionData( ) is "00003". The clpi file included in the Clip for the R video is identified from this description. The clpi file "00003.clpi" is also downloaded from the server 22 together with the m2ts file "00003.m2ts" for the corresponding R video stream and is stored in the local storage 34.

Moreover, the start position and the end position of the playback interval of the SubPlayItem are respectively identified from SubPlayItem_IN_time and SubPlayItem_OUT_time of SubPlayItem( ) of ExtensionData( ). That the ID of SubPath that refers to the R video stream is 0 (ref_to_Sub-Path_id=0) and the PID (ref_to_R_video_PID) of the transport packet included in the R video stream are identified from STN_table_extension( ) In the case of this example, the value of type of STN_table extension( ) is 2.

Figure 35:
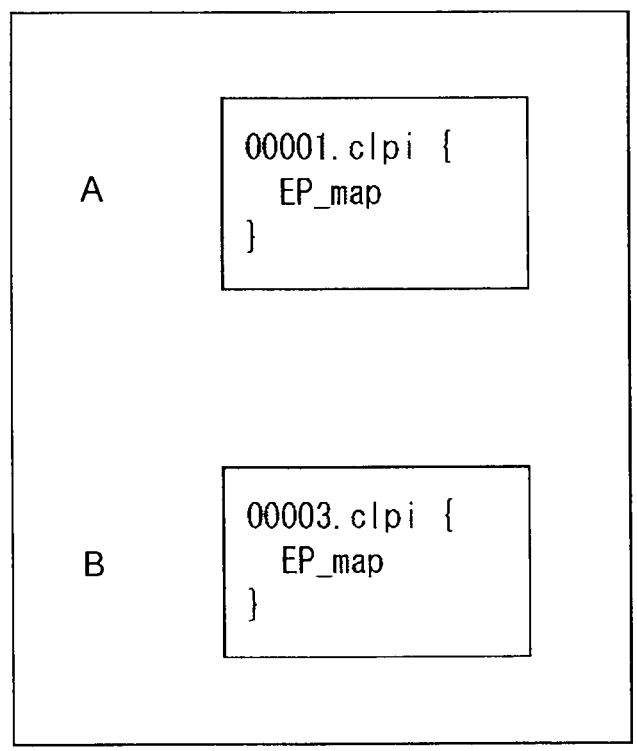
FIG. 35 is a diagram illustrating the syntax of a clpi file.

FIG. 35 is a diagram illustrating the syntax of a clpi file.

Part A of FIG. 35 is a diagram illustrating an example of the clpi file "00001.clpi". As illustrated in part A of FIG. 35, the clpi file "00001.clpi" includes EP_map. Part B of FIG. 35 is a diagram illustrating an example of the clpi file "00003.clpi". As illustrated in part B of FIG. 35, the clpi file "00003.clpi" also includes EP_map.

For example, EP_map included in the clpi file "00001.clpi" and EP_map included in the clpi file "00003.clpi" include information regarding EPs that are set at the same time with respect to the time t0 at the beginning of content. The position of the L video stream at which playback is started by using EP_map included in the clpi file "00001.clpi" and the position of the R video stream at which playback is started by using EP_map included in the clpi file "00003.clpi" are at the same position along the time axis with respect to the time t0.

Figure 36:
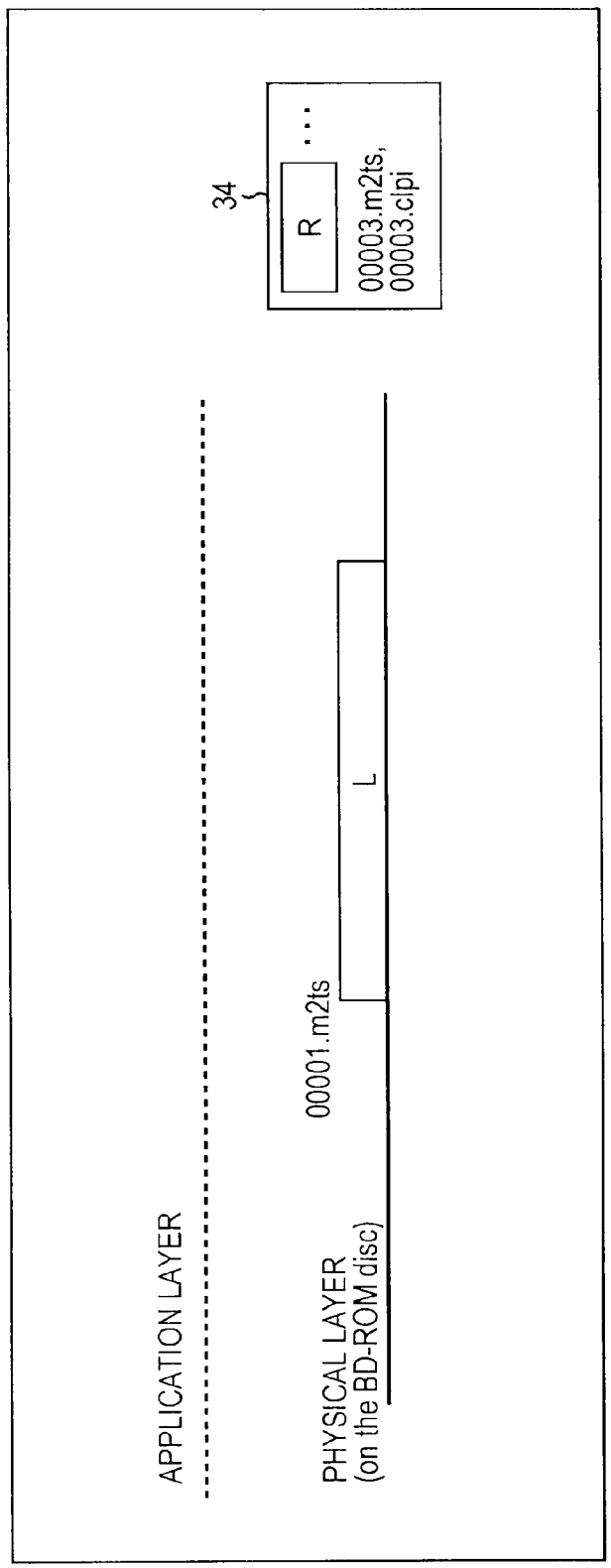
FIG. 36 is a diagram illustrating the concept of file management.

FIG. 36 is a diagram illustrating the concept of file management that is performed by using the files in FIGS. 34 and 35.

As illustrated in FIG. 36, a TS including the L video stream recorded on the optical disc 2 is managed by the m2ts file "00001.m2ts". Moreover, a TS including the R video stream recorded in the local storage 34 is managed by the m2ts file "00003.m2ts".

For a BD, data recorded on the BD and data recorded in a local storage are managed by a virtual file system in which a file system, such as a UDF file system, for managing data recorded on the BD and a file system for managing data recorded in the local storage are merged together. A player including the local storage generates such a virtual file system, and manages data recorded on the BD and data recorded in the local storage.

When an application specifies a file to be read, the virtual file system identifies whether the file is recorded on the BD or in the local storage and identifies the address representing the recorded position on the recording medium, and the file is read from the identified address of the identified recording medium.

For example, when the application specifies the m2ts file "00001.m2ts", the virtual file system identifies that the m2ts file "00001.m2ts" is recorded at a predetermined position on the optical disc 2, and the file is read by the disc drive 32.

Moreover, when the application specifies the m2ts file "00003.m2ts", the virtual file system identifies that the m2ts file "00003.m2ts" is recorded at a predetermined position in the local storage 34, and the file is read.

Operation Example 3

Figure 37:
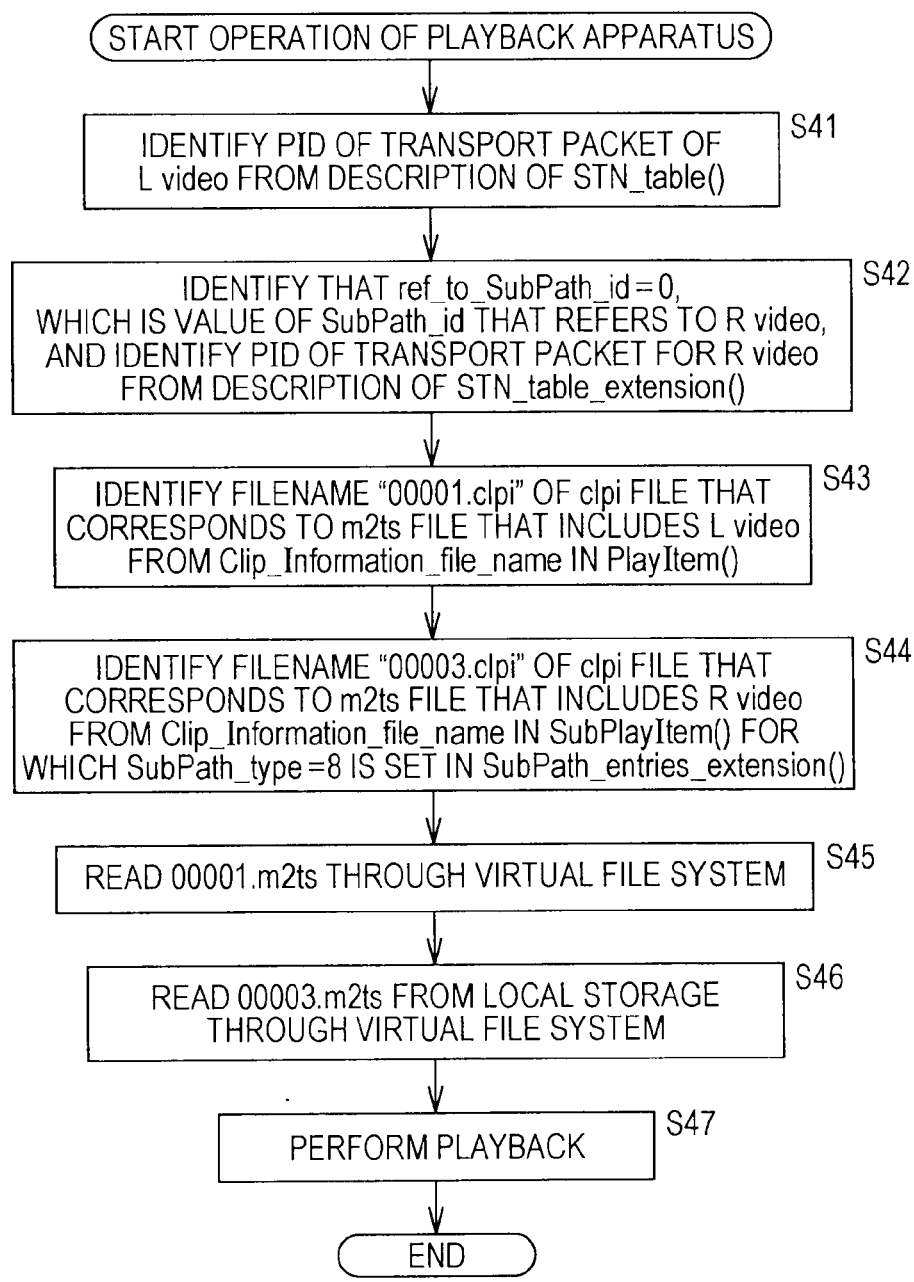
FIG. 37 is a flowchart illustrating a playback process that is performed in accordance with the PlayList file of FIG. 34.

Referring to the flowchart of FIG. 37, the process of 3D playback performed in accordance with the PlayList file of FIG. 34 will be described.

In step S41, the controller 31 identifies the PID of the transport packet of the Main TS included in the L video stream from the description of STN_table( ).

In step S42, the controller 31 identifies that ref_to_SubPath_id=0, which is a value of SubPath_id of the SubPath that refers to the R video stream, from the description of STN_table_extension( ) and identifies the PID of the transport packet included in the R video stream.

In step S43, the controller 31 identifies the filename of the clpi file that corresponds to the m2ts file of the Main TS that includes the L video stream as "00001.clpi" from Clip_Information_file_name in PlayItem( ).

In step S44, the controller 31 identifies the filename of the clpi file that corresponds to the m2ts file that includes the R video stream as "00003.clpi" from Clip_Information_file_name in SubPlayItem( ) of the SubPath to which SubPath_type=8 is set and that has SubPath_id=0 in SubPath_entries_extension( ).

In step S45, the controller 31 determines that "00001.m2ts" is the file to be read, and causes the disc drive 32 to read the file from the optical disc 2 through the virtual file system.

In step S46, the controller 31 determines that "00003.m2ts" is the file to be read, and reads the file from the local storage 34 through the virtual file system.

Data of the m2ts file "00001.m2ts", which is read by the disc drive 32, is supplied to the read buffer 52 through the separation unit 51, and is stored. The transport packet of the L video stream data stored in the read buffer 52 is extracted by the PID filter 53 on the basis of the PID identified in step S41 and supplied to the decoder 60 through the ES buffer 54 and the switch 59.

On the other hand, data of the m2ts file "00003.m2ts", which is read from the local storage 34, is supplied to the read buffer 55 through the separation unit 51, and is stored. The transport packet of the R video stream data stored in the read buffer 55 is extracted by the PID filter 56 on the basis of the PID identified in Step S42, and is supplied to the decoder 60 through the switch 57, the ES buffer 58, and the switch 59.

In step S47, the decoder 60 decodes (plays back) the packets that are successively supplied from the switch 59.

When the TS including the L video stream is recorded on the optical disc 2 and the TS including the R video stream is recorded in the local storage 34, 3D playback is performed as heretofore described.

[Operation of Performing 2D Playback]

The operation of performing 2D playback of content recorded on the optical disc 2 in accordance with the above PlayList file will be described.

Here, it is assumed that the L video stream and the R video stream are included in different TSs and that the m2ts files thereof are interleaved and stored on the optical disc 2. The arrangement of data on the optical disc 2 is illustrated in FIG. 25. 2D playback is performed in accordance with the PlayList file illustrated in FIG. 23.

In this case, a player that performs 2D playback reads only the descriptions related to the 2D playback and performs processing.

The descriptions of the PlayList file of FIG. 23 to be read are underlined in FIG. 38. As illustrated in FIG. 38, the descriptions of ExtensionData( ) which is information that is referred to when playing back the R video stream, are not read.

Moreover, the descriptions of the clpi file in part A of FIG. 24 to be read are underlined in part A of FIG. 39. As illustrated in part A of FIG. 39, chunk_map( ) which is information that is referred to when playing back the R video stream, is not read. Moreover, as illustrated in part B of FIG. 39, the entirety of the clpi file "00002.clpi" is not read.

The process will be described as follows. The playback apparatus 1 that performs 2D playback identifies the filename of the clpi file that corresponds to the m2ts file including the L video stream as "00001.clpi" from Clip_Information_file_name in PlayItem( ). Moreover, the playback apparatus 1 identifies the PID of the transport packet included in the L video stream from the description of STN_table( ).

The playback apparatus 1 reads the m2ts file "00001.m2ts" from the optical disc 2 through the UDF file system, and thereafter performs processing the same as that of reading the L video stream. That is, L video stream data that is temporarily stored in the read buffer 52 is supplied to the decoder 60 through the PID filter 53, the ES buffer 54, and the switch 59, and is played back. Because data output from the playback apparatus 1 is only the L video stream data, the display apparatus 3 displays a 2D image on the basis of the L video stream data.

In this way, the PlayList file, which has been described with reference to FIG. 23 and the like, is a file that can be used when performing 2D playback with a playback apparatus that is capable of performing 3D playback and when performing 2D playback with a playback apparatus that is not capable of performing 3D playback. Thus, it is not necessary to prepare a file for each of a playback apparatus that is capable of performing 3D playback and a playback apparatus that is not capable of performing 3D playback, and compatibility of the PlayList file and the optical disc 2, on which the PlayList file is recorded, can be maintained.

[Example Configuration of Recording Apparatus]

Figure 40:
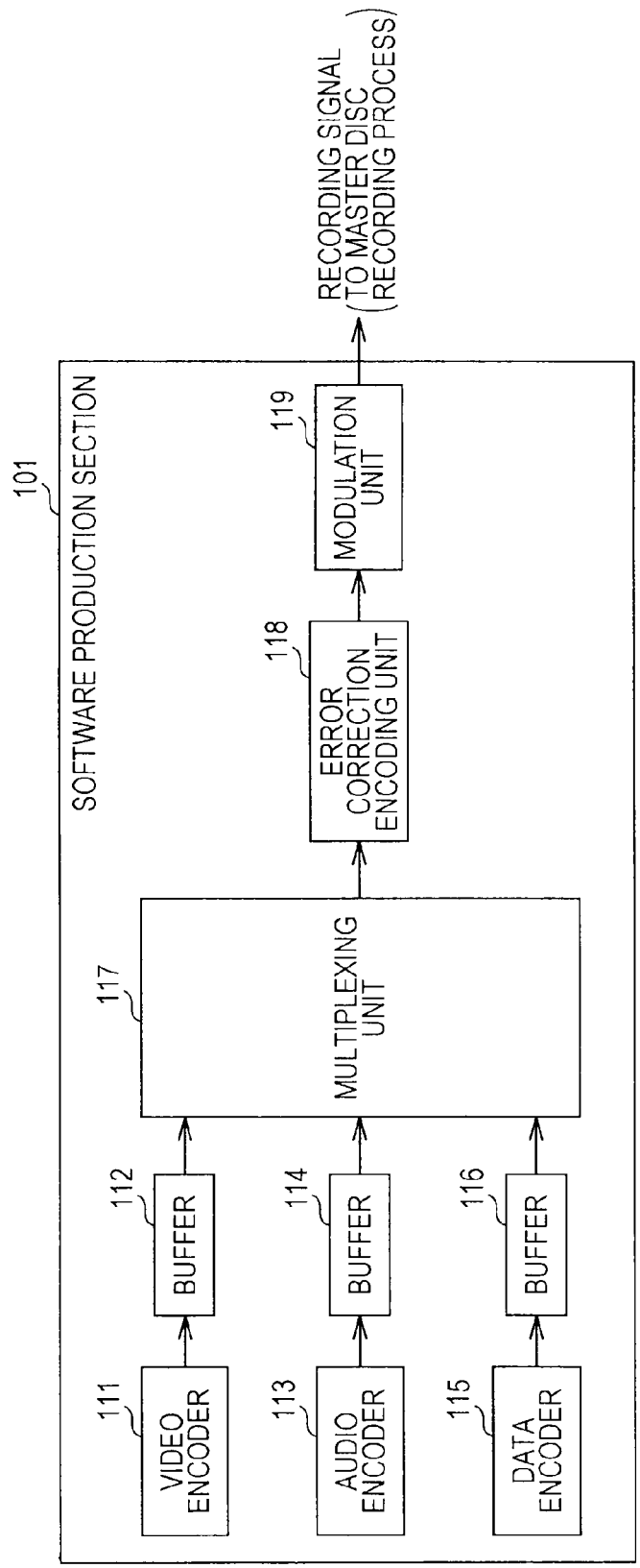
FIG. 40 is a block diagram illustrating an example configuration of a software production section.

FIG. 40 is a block diagram illustrating an example configuration of a software production section 101.

A video encoder 111 has a configuration the same as that of the MVC encoder of FIG. 3. The video encoder 111 encodes a plurality of image data items using H.264 AVC/MVC to generate an L video stream and an R video stream, and outputs the video streams to a buffer 112.

An audio encoder 113 encodes an audio stream that is input, and outputs encoded data to a buffer 114. An audio stream, which is recorded on a disc together with the L video stream and the R video stream, is input to the audio encoder 113.

A data encoder 115 encodes various data items described above excluding those for video and audio, such as a PlayList file and the like, and outputs encoded data to a buffer 116. For example, the data encoder 115 sets the above-described SubPath_entries_extension (FIG. 15), STN_table_extension (FIG. 18), MVC_flag (FIG. 12), and MVC_file_type (FIG. 13), and generates a PlayList file that has been described with reference to FIG. 11.

A multiplexing unit 117 multiplexes the video data, the audio data, and the non-stream data together with a synchronizing signal, and outputs multiplexed data to an error correction encoding unit 118.

The error correction encoding unit 118 adds an error correction code to the data multiplexed by the multiplexing unit 117.

A modulation unit 119 modulates data supplied from the error correction encoding unit 118, and outputs modulated data. The output of the modulation unit 119 is software that can be played back by the playback apparatus 1 and that is recorded on the optical disc 2.

The software production section 101 having such a configuration is provided in the recording apparatus.

Figure 41:
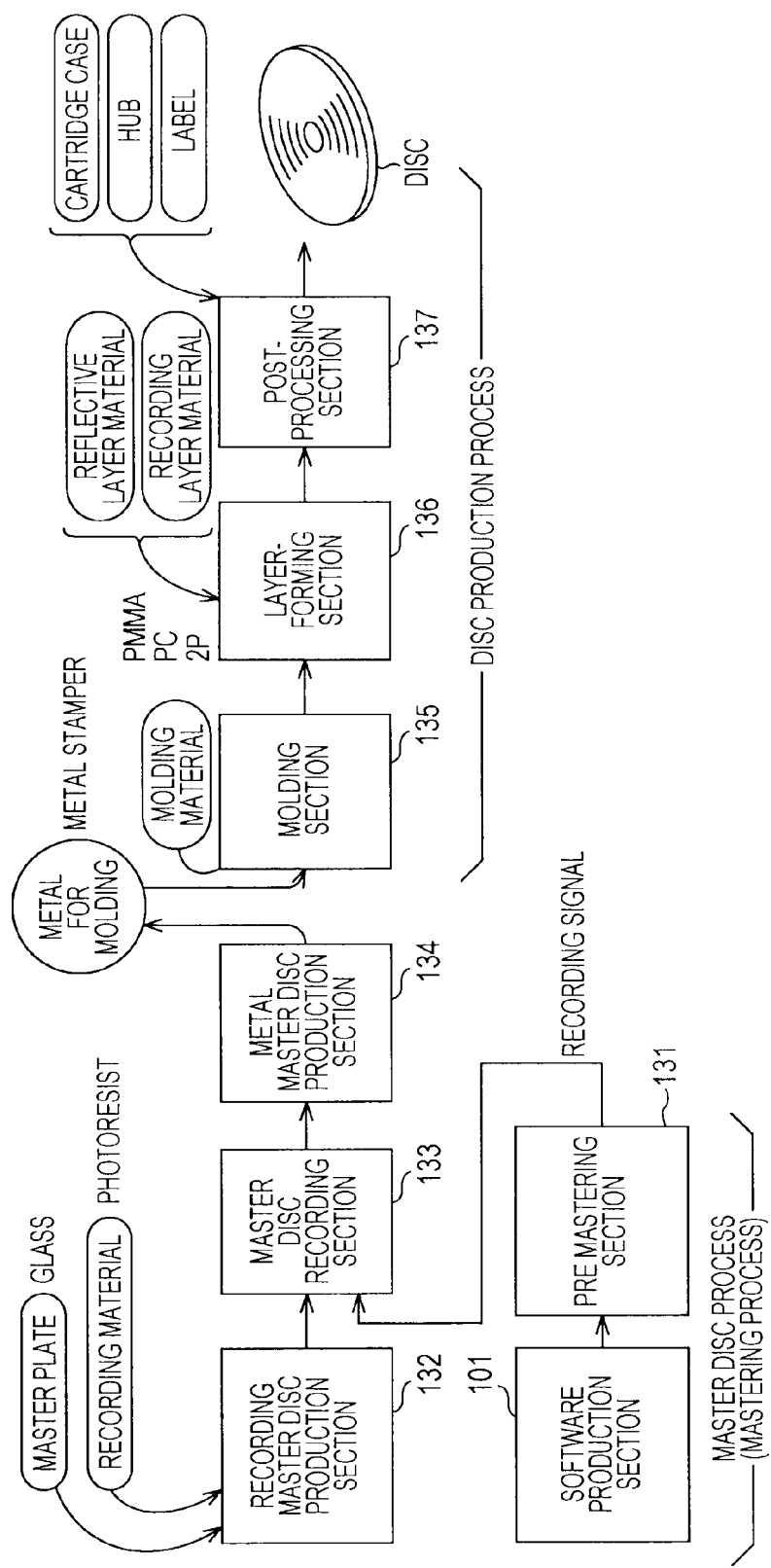
FIG. 41 is a diagram illustrating an example configuration including the software production section.

FIG. 41 is a diagram illustrating an example configuration including the software production section 101.

A part of the configuration illustrated in FIG. 41 may be provided in the recording apparatus.

A premastering section 131 performs a mastering process on a record signal that has been generated by the software production section 101, and a signal having a format to be recorded on the optical disc 2 is generated. The generated signal is supplied to a master disc recording section 133.

In a recording master disc production section 132, a master disc, which is made of glass or the like, is prepared, and a recording material, which includes a photo resist and the like, is applied to the master disc. Thus, a recording master disc is produced.

In the master disc recording section 133, a laser beam is modulated in accordance with the record signal that is supplied from the premastering section 131, and the photo resist on the master disc is irradiated with the laser beam.

Thus, the photo resist on the master disc is exposed to light in accordance with the record signal. Subsequently, the master disc is developed so as to generate pits on the master disc.

In a metal master disc production section 134, an electroforming process and the like are performed on the master disc, and a metal master disc, to which the pits are transferred from the glass master disc, is produced. Further, a metal stamper is produced from this metal master disc, and the metal stamper is used as a metal mold.

In a molding section 135, a material, such as PMMA (acrylic), PC (polycarbonate), or the like is poured into the metal mold by injection or the like, and is cured. Alternatively, 2P (UV curable resin) or the like is applied onto the metal stamper, and then is cured by irradiating UV rays. Thus, the pits on the metal stamper can be transferred onto a replica that is made of a resin.

In a layer-forming section 136, a reflective layer is formed on the replica by deposition, sputtering, or the like. Alternatively, a reflective layer is formed on the replica by spin coating.

In a post-processing section 137, necessary processes are performed, such as processing of the inside and outside diameters of the disc and bonding two discs together. In this way, making of the above-described optical disc 2, on which data that can be played back by the playback apparatus 1 is recorded, is completed.

[Example Configuration of Computer]

The series of processing described above can be performed by using hardware or by using software. When performing the series of processing by using software, a program included in the software is installed from a program recording medium into a computer that is built in a dedicated hardware, a general-purpose computer, or the like.

Figure 42:
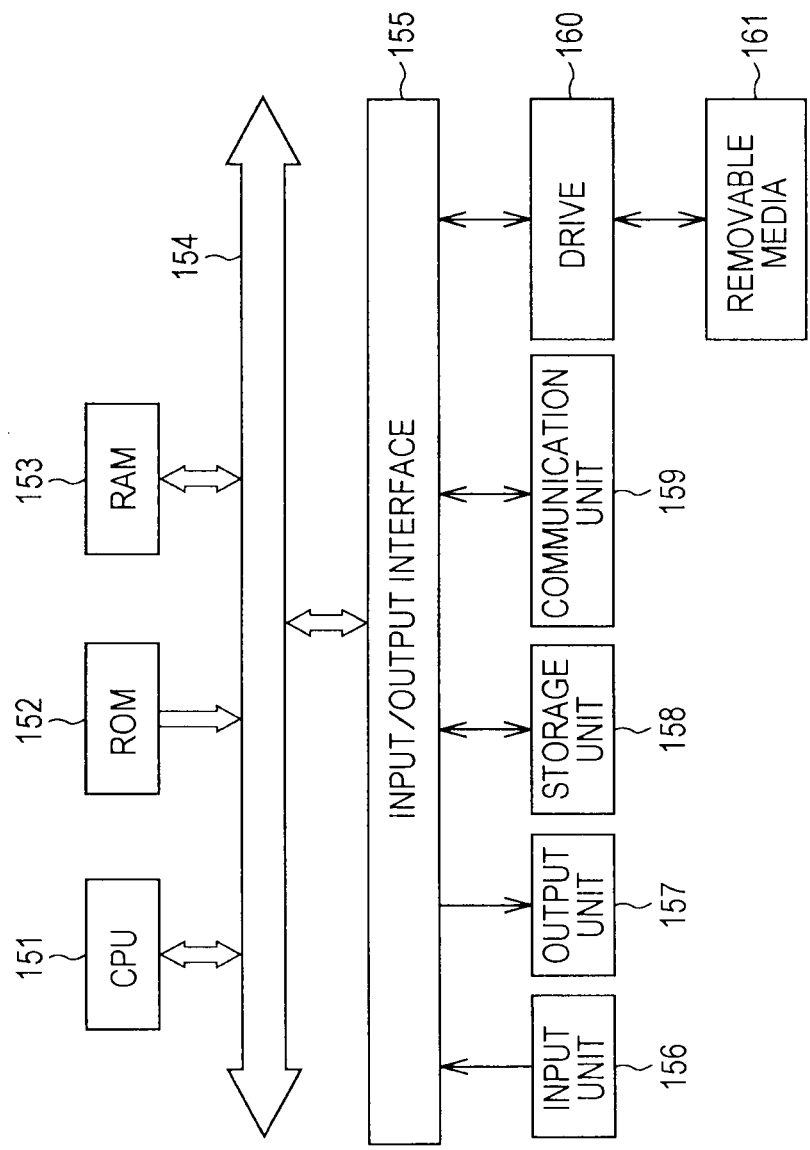
FIG. 42 is a block diagram illustrating an example configuration of a computer.

FIG. 42 is a block diagram illustrating an example configuration of the hardware of a computer that executes the series of processing described above in accordance with a program.

A CPU (Central Processing Unit) 151, a ROM (Read Only Memory) 152, and a RAM (Random Access Memory) 153 are interconnected by a bus 154.

Moreover, an input/output interface 155 is connected to the bus 154. An input unit 156 including a keyboard, a mouse, and the like; and an output unit 157 including a display, a speaker, and the like are connected to the input/output interface 155. Moreover, a storage unit 158 including a hard disk, a non-volatile memory, and the like; a communication unit 159 including a network interface and the like; and a drive 160 that drives a removable media 161 are connected to the input/output interface 155.

With the computer having the above configuration, the CPU 151, for example, loads a program stored in the storage unit 158 to the RAM 153 through the input/output interface 155 and the bus 154 and executes the program, thereby performing the series of processing described above.

The program executed by the CPU 151 is, for example, stored in the removable media 161, or is supplied through a wired or wireless transmission medium such as a local area network, the Internet, or digital broadcasting, and is installed in the storage unit 158.

The program executed by the computer may be a program that performs processing in a time series in the order of the description of the present specification, or may be a program that performs processing parallely or at necessary timing when the program is called.

An embodiment of the present invention is not limited to the embodiment described above, and may be modified in various ways within the spirit and scope of the present invention.

REFERENCE SIGNS LIST 1 playback apparatus
2 optical disc
3 display apparatus
11 H.264/AVC encoder
12 H.264/AVC decoder
13 Dependent view video encoder
14 multiplexer
31 controller
32 disc drive
33 memory
34 local storage
35 Internet interface
36 decoding section
37 operation input unit

The invention claimed is:

1. A reproduction apparatus comprising:
processing circuitry; and
memory storing
　a reading unit which reads from a recording medium a PlayList file, which contains information for controlling reproduction of a basic stream and an expanded stream obtained by encoding a video stream imaged from a plurality of viewing points by H.264 AVC/MVC, in which information on a play item configuring a main reproduction path referring to the basic stream and a PID of a transport packet of the basic stream are described in a play item field that is a field within a playlist field, information on a sub reproduction path referring to the expanded stream is described in a first field in an expanded field that is a field outside the playlist field, and a PID of a transport packet of the expanded stream is described in a second field in the expanded field, a first transport stream which includes the basic stream, and a second transport stream which includes the expanded stream referred to by the sub reproduction path represented by the information described in the first field;
　a first separation unit which separates the transport packet of the basic stream from the first transport stream based on the PID described in the play item field in the PlayList file;
　a second separation unit which separates the transport packet of the expanded stream from the second transport stream based on the PID described in the second field in the expanded field;
　a decoding unit which decodes the transport packet of the basic stream separated by the first separation unit and the transport packet of the expanded stream separated by the second separation unit; and a display unit which displays the decoded transport packet to a user.

2. The reproduction apparatus according to claim 1, wherein the information on the sub reproduction path includes sub reproduction path type information which represents a sub reproduction path referring to the expanded stream.

3. The reproduction apparatus according to claim 1, wherein the second field further includes type information representing that the expanded stream is included in a transport stream which is different from that of the basic stream.

4. The reproduction apparatus according to claim 1, wherein the expanded field is a field outside the play item field.

5. The reproduction apparatus according to claim 1, further comprising: a reproduction unit which reproduces content of the decoded transport packet for output to the user.

6. A reproduction method implemented by a reproduction apparatus having processing circuitry and memory, the method comprising the steps of:

reading from a recording medium a PlayList file, which contains information for controlling reproduction of a basic stream and an expanded stream obtained by encoding a video stream imaged from a plurality of viewing points by H.264 AVC/MVC, in which information on a play item configuring a main reproduction path referring to the basic stream and a PID of a transport packet of the basic stream are described in a play item field that is a field within a playlist field, information on a sub reproduction path referring to the expanded stream is described in a first field in an expanded field that is a field outside the playlist field, and a PID of a transport packet of the expanded stream is described in a second field in the expanded field, a first transport stream which includes the basic stream, and a second transport stream which includes the expanded stream referred to by the sub reproduction path represented by the information described in the first field;

separating, using the processing circuitry, the transport packet of the basic stream from the first transport stream based on the PID described in the play item field in the PlayList file;

separating, using the processing circuitry, the transport packet of the expanded stream from the second transport stream based on the PID described in the second field in the expanded field;

decoding, using the processing circuitry, the separated transport packet of the basic stream and the separated transport packet of the expanded stream; and displaying the decoded transport packet to a user.

* * * * *